US012412720B2

(12) United States Patent
Dunn et al.

(10) Patent No.: US 12,412,720 B2
(45) Date of Patent: Sep. 9, 2025

(54) OPTIMIZED SLOT MOTOR FOR REMOTE SECONDARY CONTACTS IN A CIRCUIT BREAKER

(71) Applicant: EATON INTELLIGENT POWER LIMITED, Dublin (IE)

(72) Inventors: Rachel A. Dunn, Canonsburg, PA (US); Michael Martin, Mars, PA (US); Vincenzo Piazza, Newmarket (GB); Matthew Boxall, Cambridge (GB); Carl Hayton, Cambridge (GB); Michael Cantor, Cambridge (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 278 days.

(21) Appl. No.: 17/991,307

(22) Filed: Nov. 21, 2022

(65) Prior Publication Data

US 2023/0187158 A1 Jun. 15, 2023

Related U.S. Application Data

(60) Provisional application No. 63/289,772, filed on Dec. 15, 2021.

(51) Int. Cl.
*H01H 77/10* (2006.01)
*H01H 71/52* (2006.01)

(52) U.S. Cl.
CPC ........ *H01H 77/108* (2013.01); *H01H 71/523* (2013.01)

(58) Field of Classification Search
CPC ...... H01H 77/108; H01H 71/523; H01H 1/54; H01H 89/06
USPC .......................................................... 335/16
See application file for complete search history.

(56) References Cited

U.S. PATENT DOCUMENTS 4,546,336 A * 10/1985 Petrie .................... H01H 73/18 335/201
4,546,337 A * 10/1985 Petrie .................. H01H 77/108 335/201
4,743,720 A * 5/1988 Takeuchi ............... H01H 9/302 335/201
4,963,849 A * 10/1990 Kowalczyk ............ H01H 9/362 218/35
6,281,459 B1 * 8/2001 Munsch ............... H01H 77/108 335/147
6,831,536 B1 * 12/2004 Zindler ................ H01H 77/108 335/201

(Continued)

*Primary Examiner* — Shawki S Ismail
*Assistant Examiner* — Lisa N Homza
(74) *Attorney, Agent, or Firm* — Eckert Seamans Cherin & Mellott, LLC

(57) ABSTRACT

A slot motor for use with secondary contacts in a circuit breaker includes a top slot motor component structured to be attached to a moving arm of the secondary contacts; and a U-shaped bottom slot motor component including a base and a pair of legs extending upward from the base, the U-shaped bottom slot motor component structured to be separated from the top slot motor component by vertical gaps between the top slot motor component and ends of the pair of legs, wherein the slot motor is structured to generate a magnetic field producing a force to maintain the secondary contacts in closed position upon passing high current through the moving arm.

13 Claims, 19 Drawing Sheets

(56) References Cited

U.S. PATENT DOCUMENTS

| | | | | |
|---|---|---|---|---|
| 7,348,514 | B2 * | 3/2008 | Puskar | H01H 77/108 218/154 |
| 9,704,676 | B1 * | 7/2017 | Cardwell | H01H 9/362 |
| 2004/0227603 | A1 * | 11/2004 | Ciarcia | H01H 1/2058 335/202 |
| 2008/0079519 | A1 * | 4/2008 | Shea | H01H 77/108 335/201 |
| 2014/0253264 | A1 * | 9/2014 | Eberts | H01H 9/30 335/16 |
| 2017/0271112 | A1 * | 9/2017 | Ferree | H01H 9/446 |

* cited by examiner

OPTIMIZED SLOT MOTOR FOR REMOTE SECONDARY CONTACTS IN A CIRCUIT BREAKER

CROSS REFERENCE TO RELATED APPLICATIONS

The present application claims priority to U.S. Provisional Patent Application No. 63/289,772 filed Dec. 15, 2021, which is incorporated herein by reference in its entirety.

FIELD OF THE INVENTION

The disclosed concept relates generally to a slot motor, and in particular an optimized slot motor for remote secondary contacts in a circuit breaker.

BACKGROUND OF THE INVENTION

During a short circuit event, secondary contacts in remote-controlled circuit breakers (e.g., smart circuit breakers controllable by an end-user via wireless or wired connections) may rely on a slot motor to prevent chattering and excess heat generation, which can lead to tack or contact welding at the contacts.

Typically, one component of the slot motor is attached to a moving arm of the secondary contacts, while the other component is fixed in place within the assembly. The magnetic force between the two keeps the contacts closed during a high current event. However, the contacts still open frequently at low voltage drive and at a very high rate at high voltage drive, evidencing inefficacy of the conventional slot motor. Further, sometimes a circuit breaker with the conventional slot motor has sufficient contact force to prevent welds at inrush current smaller than a threshold (e.g., approximately 2500 A), allowing the contacts to open and tack weld to occur in the inrush current events beyond such threshold (e.g., approximately 2500 A). Upon the occurrence of the weld, the secondary contacts become useless as they are now welded together.

There is a considerable room for improvement in the slot motors for the secondary contacts in circuit breakers.

SUMMARY OF THE INVENTION

These needs, and others, are met by embodiments of the disclosed concept in which a slot motor for use with secondary contacts in a circuit breaker is provided. The slot motor includes a top slot motor component structured to be attached to a moving arm of the secondary contacts; and a U-shaped bottom slot motor component including a base and a pair of legs extending upward from the base, the U-shaped bottom slot motor component structured to be separated from the top slot motor component by vertical gaps between the top slot motor component and ends of the pair of legs, where the slot motor is structured to generate a magnetic field producing a force to maintain the secondary contacts in a closed position during a high current event.

Another embodiment provides a circuit breaker connected to a power source via a line conductor and a load via a load conductor. The circuit breaker includes: primary contacts coupled to the line conductor; an operating mechanism structured to cause the primary contacts to trip open the circuit breaker during a high current event; secondary contacts coupled to the load conductor and structured to open or close the circuit breaker based on a user instruction received upon tripping of the circuit breaker; and a slot motor coupled to a secondary moving arm of the secondary contacts. The slot motor includes a top slot motor component structured to be attached to a moving arm of the secondary contacts; and a U-shaped bottom slot motor component including a base and a pair of legs extending upward from the base, the U-shaped bottom slot motor component structured to be separated from the top slot motor component by vertical gaps between the top slot motor component and ends of the pair of legs, where the slot motor is structured to generate a magnetic field producing a force to maintain the secondary contacts in a closed position during a high current event.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1A:
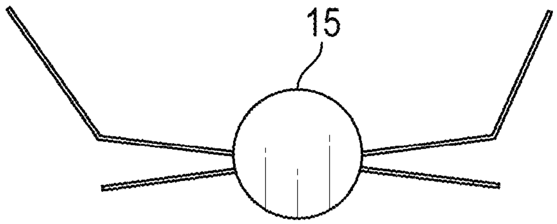
FIGS. 1A-B illustrate a weld and a melt spot created by an inrush current going through secondary contacts in a circuit breaker.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

In general, during short circuit events secondary contacts in remote-controlled circuit breakers (e.g., smart circuit breakers controllable by an end-user via wireless or wired connections) may rely on a slot motor to prevent chattering and excess heat generation, which can lead to tack or contact welding at the contacts. Contact welding occurs when there is enough energy generated during an inrush current event to melt the material of the contacts. There are two possible sources of melt energy: contact resistance causing resistance heating and arc created when the contacts are not touching due to, e.g., insufficient force to hold the contacts together during the short circuit event. An arc flash may result if the slot motor grounds or if a slot motor gap is large. Contact resistance R is provided as:

$$R = \frac{\rho}{2a} \quad \text{EQ. 1}$$

where ρ is material resistivity of the contacts and a is area in contact. Assuming asperities on one contact surface touch the other contact surface, the area a in contact depends on hardness and contact force, as follows:

$$a = \sqrt{\frac{F}{\pi H}} \quad \text{EQ. 2}$$

where F is contact force and H is hardness. Contact resistance R can be also provided as:

$$R = \frac{\rho}{2}\sqrt{\frac{\pi H}{F}} \quad \text{EQ. 3}$$

Figure 1B:
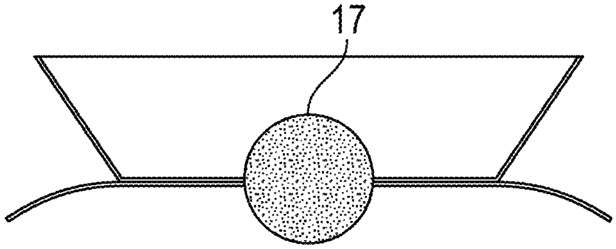

As such, the bigger the contact force F, the smaller the contact resistance R. The resistance heating $E_{heating}$ in the contact caused by the contact resistance can be provided as:

$$E_{heating} = RI^2\Delta t \quad \text{EQ. 4}$$

where I is the inrush current. For current below the minimum weld current, there is not enough heating to reach the melting point. The energy $E_{melt}$ used for melting the contact material can be:

$$E_{melt} = R(I^2 - I_{min\ weld}^2)\Delta t \quad \text{EQ. 5}$$

where $I_{min\ weld}$ is the minimum current for a weld to form. In a high inrush current event, the current I going through the contact resistance generates heat. The melt energy $E_{melt}$ deposited in an arc flash is many times greater than the melt energy $E_{melt}$ when the contacts are closed. If the contacts open during the high inrush current event, then very strong welds (e.g., 711.7 N (i.e., 160 lbf)) welds) can be expected. As such, if there is sufficient heat, it will melt the contact materials and create a contact weld 15 as shown in FIG. 1A. The volume $v_{melt}$ of melted material is:

$$v_{melt} \approx \frac{E_{melt}}{d(C_v T_{melt} + C_{fusion})} \quad \text{EQ. 6}$$

where d is the density, $C_v$ is the specific heat of the contact material, $C_{fusion}$ is the latent heat of fusion of the contact material, and $T_{melt}$ is the melting temperature of contact materials. The area $\alpha_{melt}$ of the melt spot 17 as shown in FIG. 1B from simple geometry is:

$$a_{melt} = \pi\left(\frac{3v_{melt}}{4\pi}\right)^{\frac{2}{3}} \quad \text{EQ. 7}$$

The strength $F_{weld}$ of the weld is given by the area of the melt spot and the material tensile strength as follows:

$$F_{weld} \approx \frac{a_{melt}}{\sigma} \quad \text{EQ. 8}$$

where σ is the tensile strength. The weld strength $F_{weld}$ is a function of the deposited energy and can be provided as:

$$F_{weld} \approx k(E_{melt})^{\frac{2}{3}} \quad \text{EQ. 9}$$

where K is constant.

The practical problem is to get a good value for the constant K and this depends on the contact material. Experimental values are better than theoretically calculated ones. A large variation in weld strengths (e.g., 10:1) has been observed. Experimental measurements of variation of weld strength show that the majority of welds (80%) are only a small fraction (30% or less) of the maximum weld strength. In practice, this means a few high inrush current events result in "super welds." Most inrush current events result in low strength tack welds.

The area of contact theory and contact welding is an active area of research and substantial work on these subjects has been undertaken. It has been shown that it is possible to estimate the minimum current required to weld two pieces of metal together. The minimum current required to weld $i_W$ depends on resistivity, thermal conductivity, hardness, contact force as shown below:

$$i_w = \frac{2U_m\sqrt{F}}{\left[\left\{\rho_0\left[1 + \frac{2}{3}\alpha(T_1 - T_0)\right]\right\}^2 \pi(0.1H_0) + 4.45\times10^{-7}\times 4U_m^2\right]^{\frac{1}{2}}} \quad \text{EQ. 10}$$

where $\rho_0$ is initial material resistivity of the contact, $T_1$ is welding temperature, $T_0$ is the initial temperature, $H_0$ is initial hardness of the contact material, and F is contact force. For a remote circuit breaker, the estimated minimum welding current is approximately 2700 A. As such, the contacts are likely to weld in high inrush currents test where the current is approximately 6-7 kA.

Figure 2:
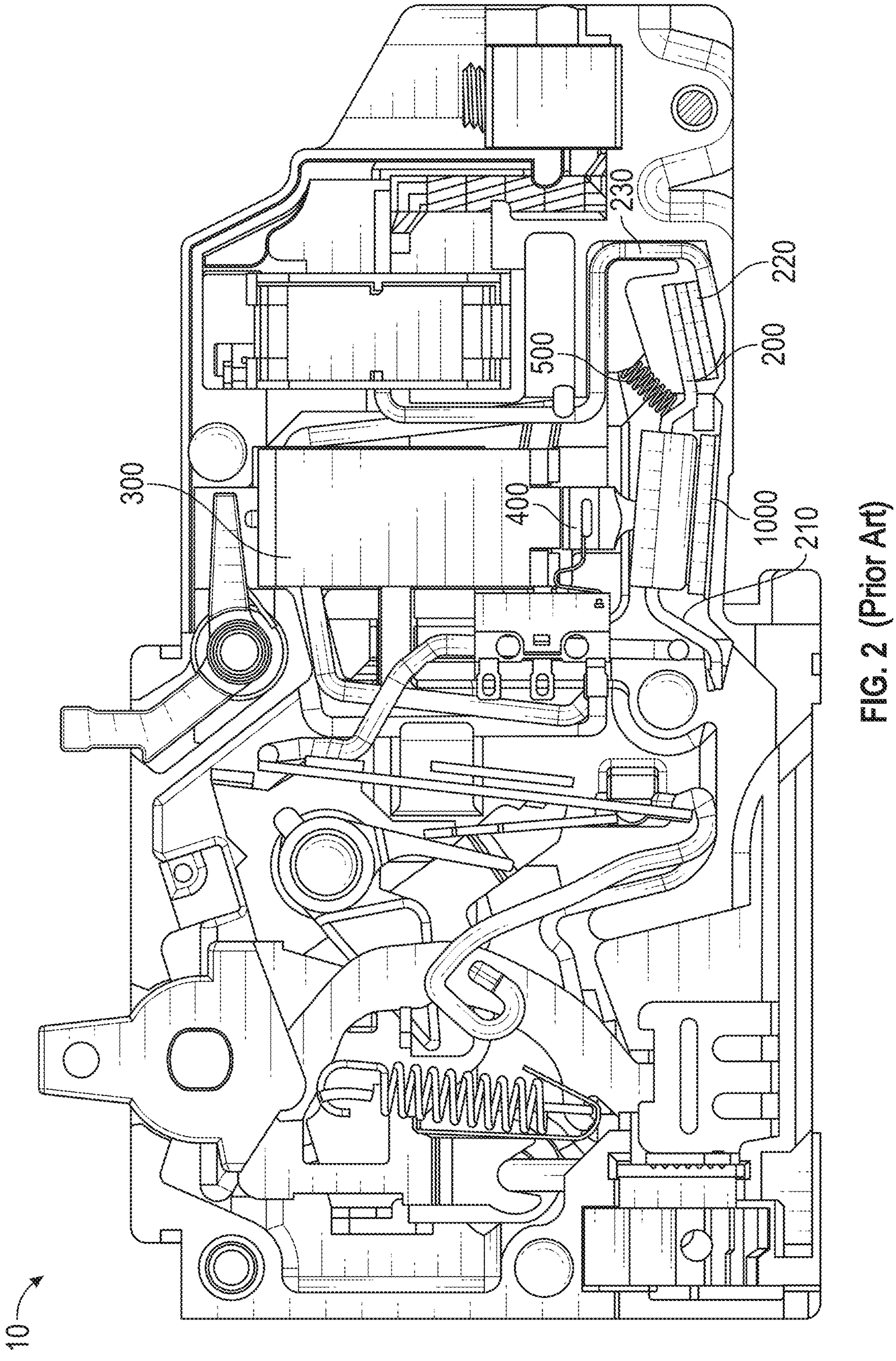
FIG. 2 (Prior Art)
FIG. 2 illustrates a circuit breaker with a conventional slot motor for secondary contacts.

Slot motors are generally used to prevent chattering and excess heat generation in the secondary contacts in a circuit breaker as shown in FIG. 2. FIG. 2 shows a circuit breaker 10 including, among others, a conventional slot motor 1000 coupled to a moving arm 210, secondary contacts 200,220, a solenoid 300, an actuator 400, and a spring 500. The actuator 400 may be of plastic, and the moving arm 210 may be of copper. The slot motor 1000 may be of carbon steel.

Figure 3A:
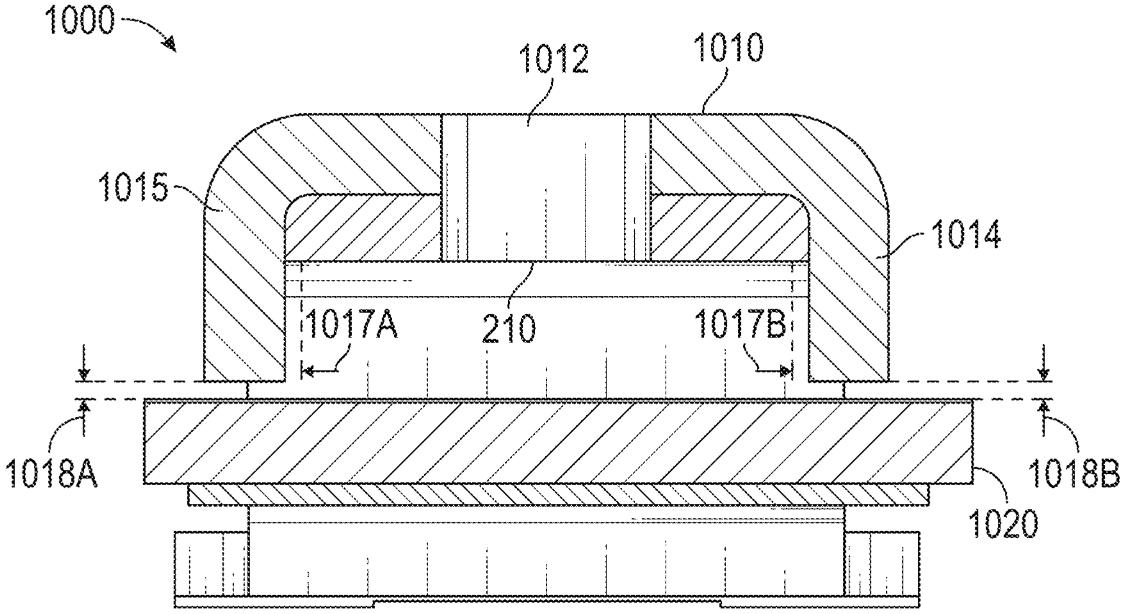
FIG. 3A (Prior Art)
FIGS. 3A-C illustrate an example conventional slot motor for secondary contacts.
Figure 3B:
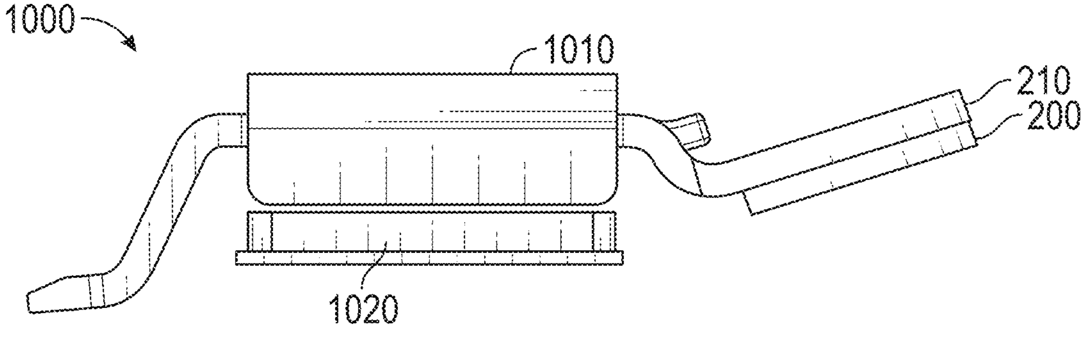
FIG. 3B (Prior Art)
Figure 3C:
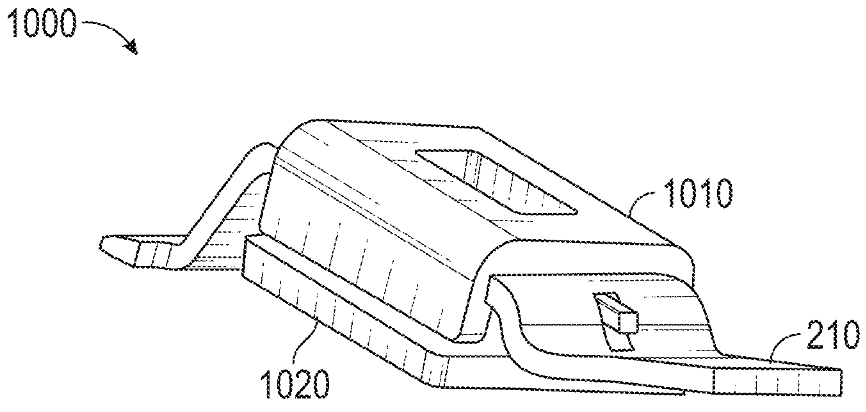
FIG. 3C (Prior Art)

FIGS. 3A-C illustrate an example conventional slot motor 1000. FIG. 3A is a cross-sectional view of the slot motor 1000, FIG. 3B is a side view of the slot motor 1000 attached to the moving arm 210, and FIG. 3C is a perspective view of the slot motor 1000 attached to the moving arm 210. The conventional slot motor 1000 includes a top slot motor component with, e.g., 0.062 inch nominal thickness and a bottom slot motor component 1020 with, e.g., 0.062 inch nominal thickness. The top slot motor component 1010 has a U-shape with a base 1012 and a pair of legs 1014,1015 extending downward towards the bottom slot motor component 1020. There are vertical gaps 1018A,B between each leg 1014,1015 of the top slot motor component 1010 and the bottom slot motor component 1020, and horizontal gaps 1017A,B between the moving arm 210 and the inner surface of the pair of legs 1014,1015 of the top slot motor component 1010. If an inrush current passes through the moving arm 210 of the secondary contacts in contact, magnetic fields will be generated, creating magnetic force (slot motor force) at the contacts 200,220. The slot motor force $F_{slot\ motor}$ increases inversely to the size of the gaps 1017A,B and 1018A,B (assuming no deformations in the contacts 200, 220).

Figure 4:
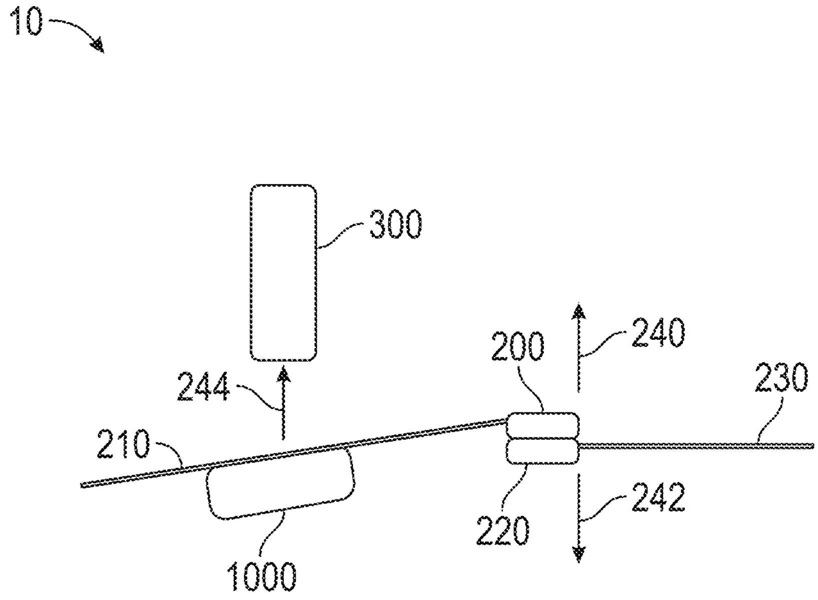
FIG. 4 (Prior Art)
FIG. 4 illustrates opening strength of the secondary contacts using an example conventional slot motor.
Figure 5A:
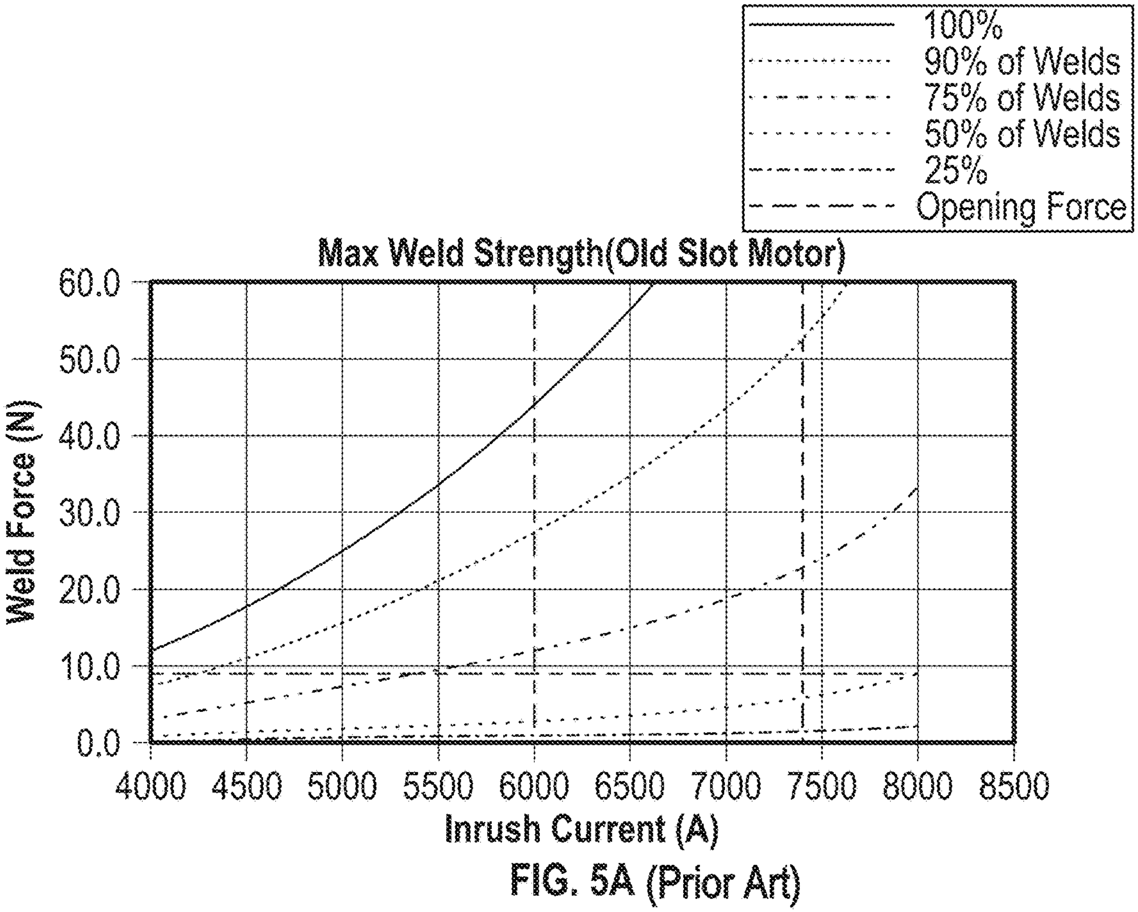
FIG. 5A (Prior Art)
FIGS. 5A-C illustrate maximum weld strengths using example conventional slot motors.
Figure 5B:
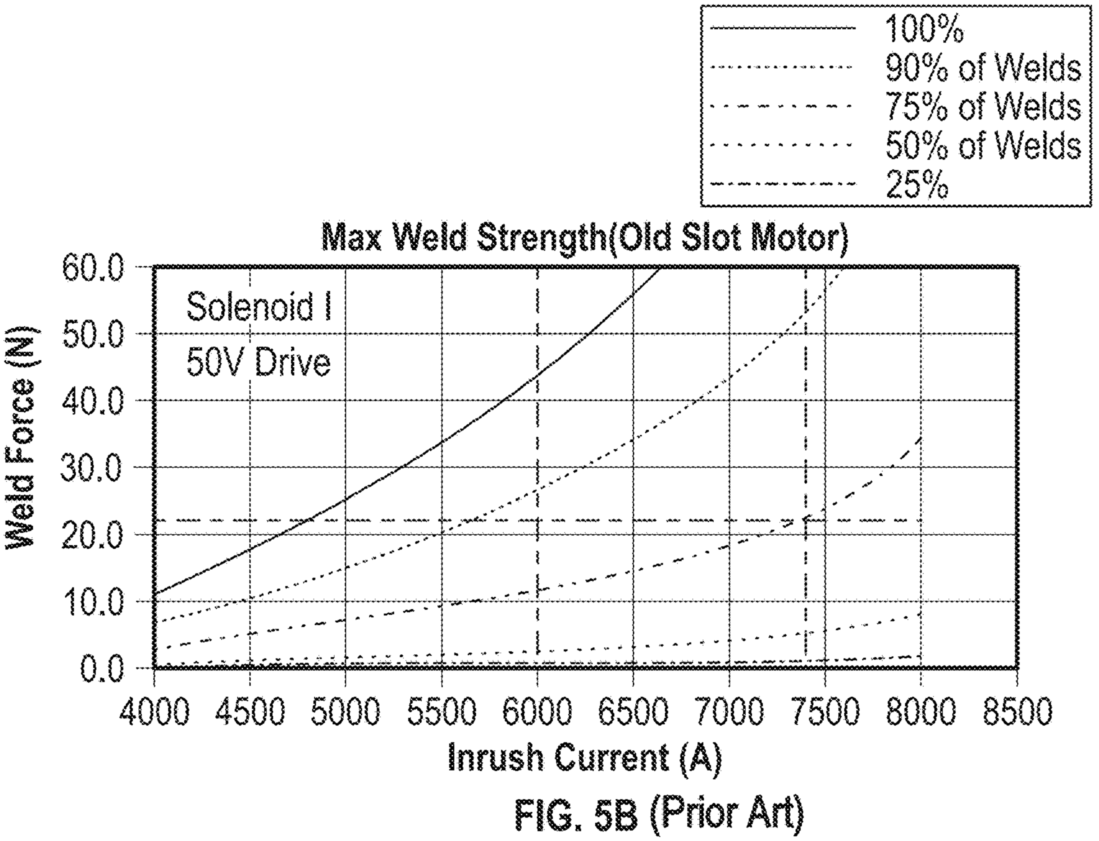
FIG. 5B (Prior Art)
Figure 5C:
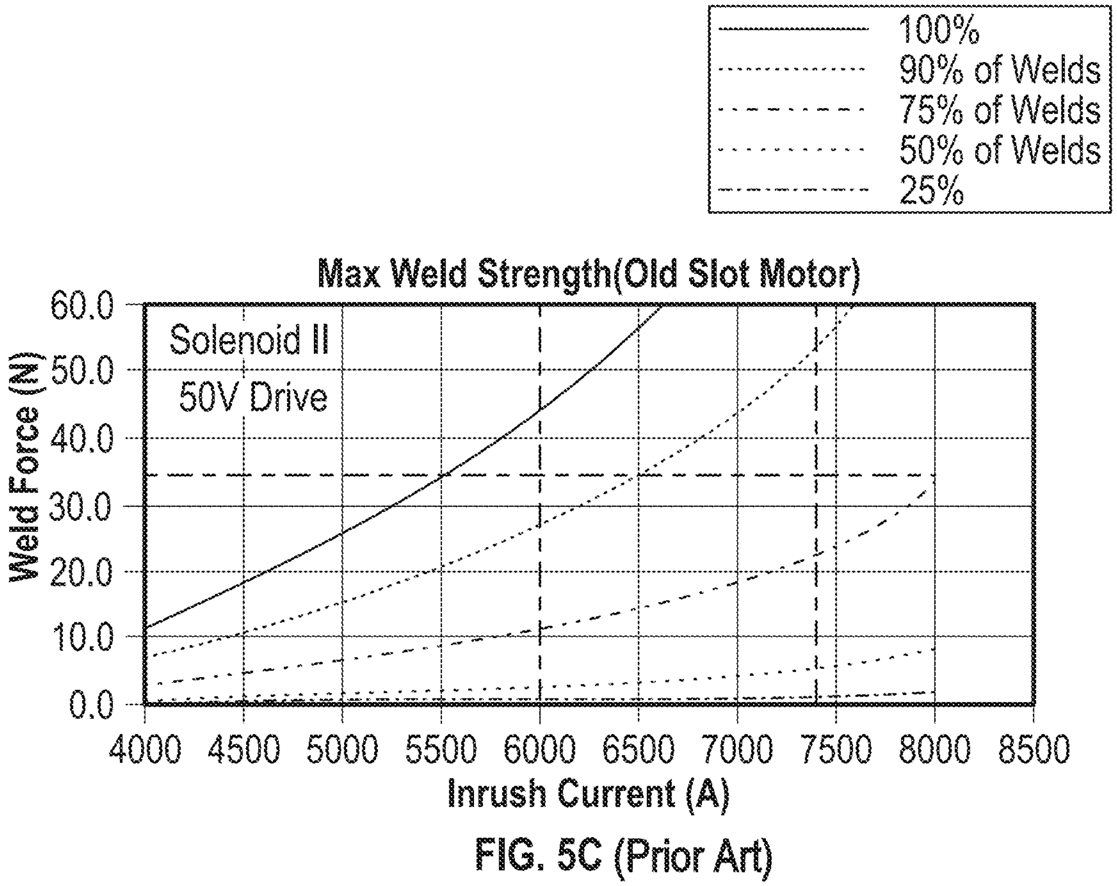
FIG. 5C (Prior Art)

FIG. 4 shows opening strength of the circuit breaker 10. The contacts 200,220 in contact are impacted by opening force $F_{open}$ 240 and weld force $F_{weld}$ 242, and solenoid force $F_{solenoid}$ 244 pulling the actuator (e.g., an actuator 400 of FIG. 2) to lift the moving arm 210 to open the contacts 200,220. If opening force $F_{open}$ is greater than the tack weld force $F_{weld}$, the tack weld can be opened. Contact opening force is provided as:

$$F_{open}=\alpha_{lever}\beta_{peel}F_{solenoid} \qquad \text{EQ. 11}$$

where $\alpha_{lever}$ is the lever arm ratio (e.g., approximately 0.5), $\beta_{peel}$ is floating pivot peel effect (e.g., approximately 3), and F solenoid is the solenoid force. The maximum weld strengths can be estimated and FIGS. 5A-C show the estimated maximum weld strengths using the conventional slot motor 1000. The estimated maximum weld strengths were obtained using measured solenoid opening forces as enumerated in the solenoid configurations as shown in Table 1 below.

TABLE 1

Solenoid Configurations

| | Force at handle | | Force at weld | |
|---|---|---|---|---|
| | lbf | N | lbf | N |
| Solenoid I (25 V) | 1.3 | 5.8 | | 8.7 |
| Higher Drive (50 V) | 3.3 | 14.7 | | 22.0 |
| Solenoid II (50 V) | | 23.0 | | 34.5 |

FIG. 5A shows the estimated maximum weld strengths at 25V drive with opening forces 5.8 N (1.3 lbf) at handle and 8.7 N at weld. FIG. 5B shows the estimated maximum weld strengths at 50V drive with opening forces 14.7 N (3.3 lbf) at handle and 22.0 N at weld. FIG. 5C shows the estimated maximum weld strengths at 50V drive with opening forces 23.0 N at handle and 34.5 N at weld, using a different solenoid (solenoid II). However, it has been shown that at 25V drive using the conventional slot motor 1000, approximately 15% of welds could be opened. With 50V drive using the conventional slot motor 1000, about 80% of welds could be opened. With 50V drive using a different solenoid, the conventional slot motor 1000 struggled to always open the welds. A simulation model predicted about 60% weld opening at 25V drive using the conventional slot motor 1000, 75% weld opening at 50V drive, and about 90% weld opening at 50V drive with a different solenoid. While the model may not be highly accurate, it gives qualitative agreement to the estimated weld strength described above.

Figure 6A:
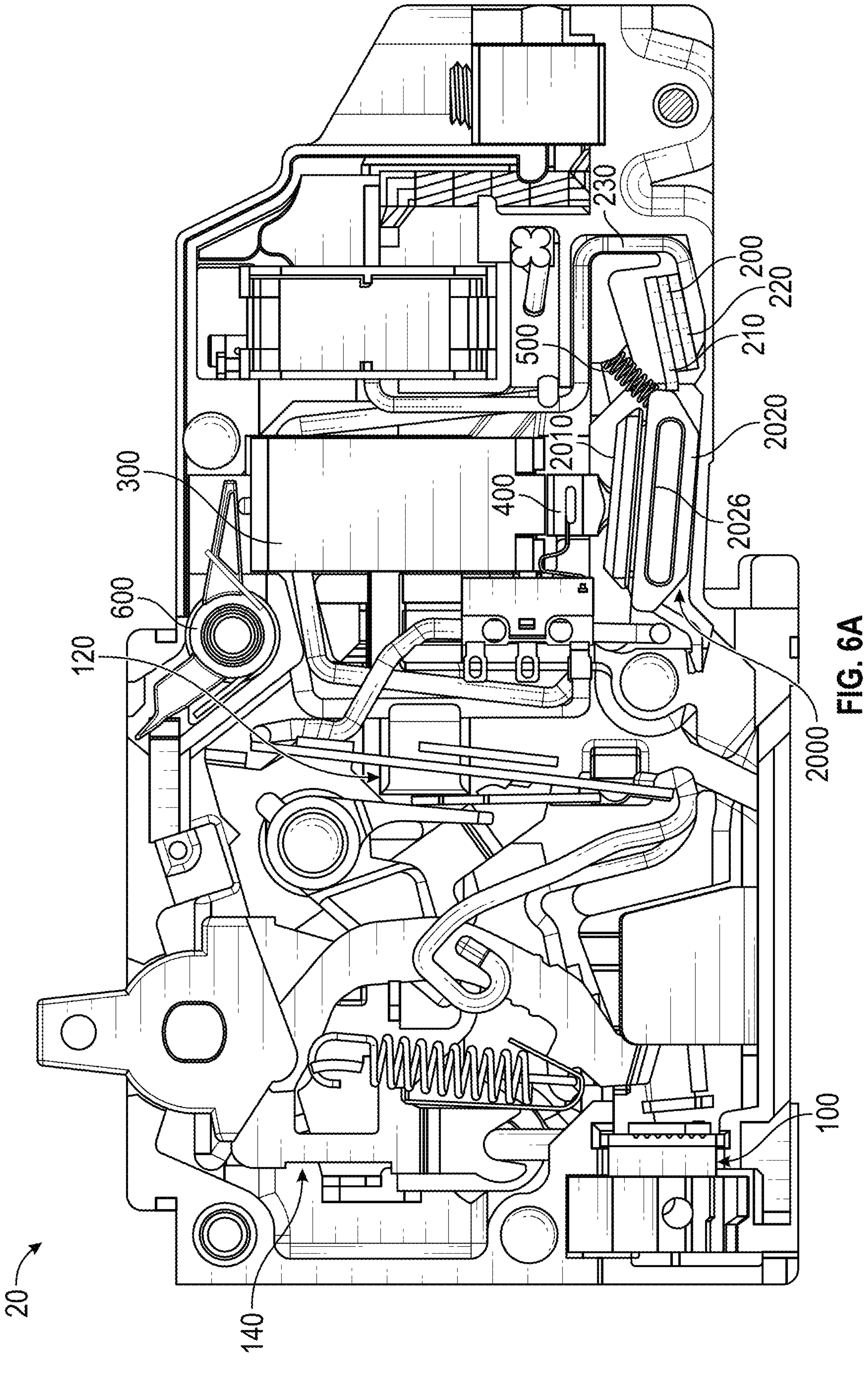
FIGS. 6A-B illustrate internal views of a circuit breaker with a slot motor according to an example embodiment of the disclosed concept.
Figure 6B:
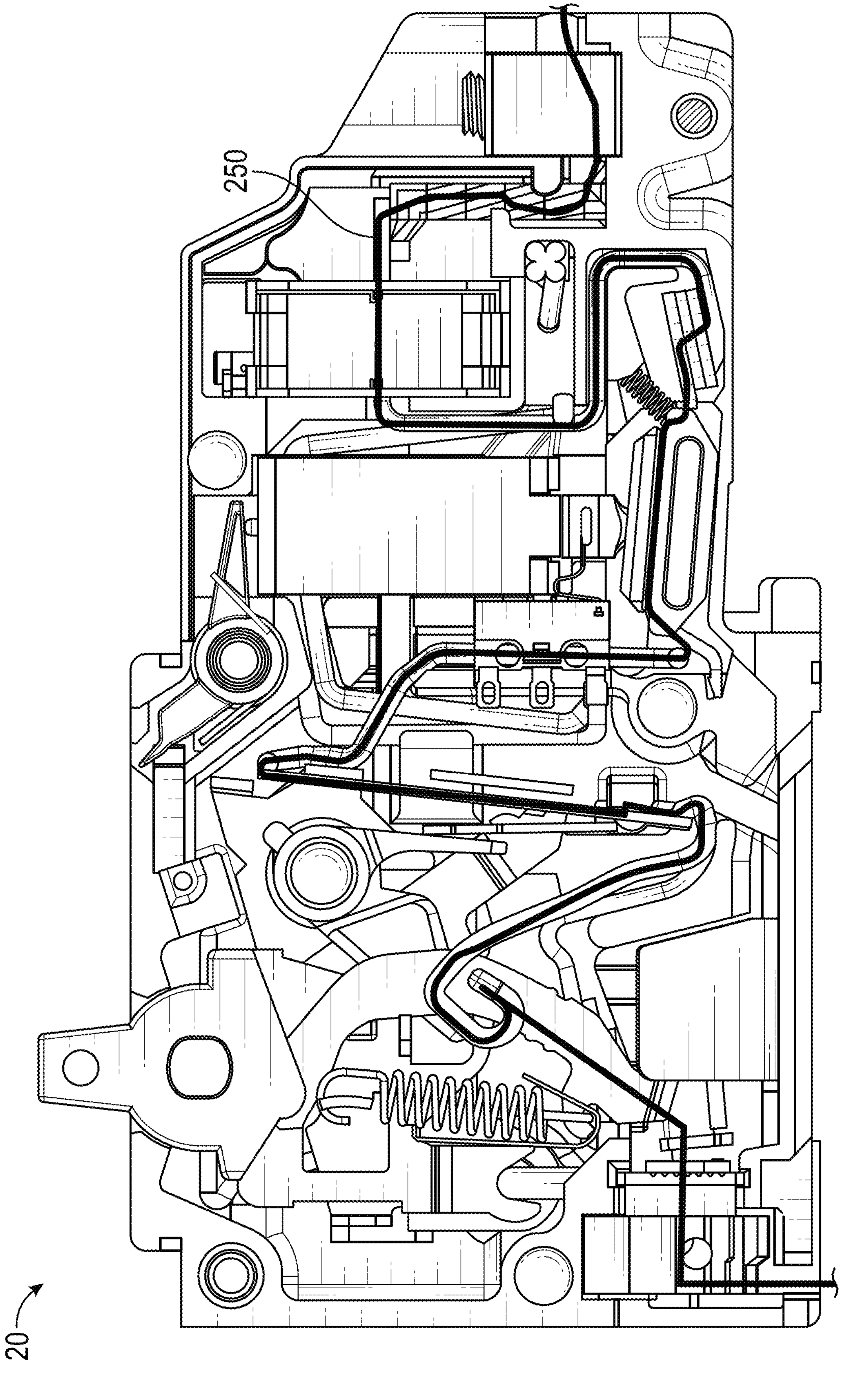

FIGS. 6A-B are internal views of a circuit breaker 20 with the inventive slot motor 2000 according to an example embodiment of the disclosed concept. The circuit breaker 20 is structured to be connected to a power source via a line conductor and a load via a load conductor, and includes primary contacts 100, a trip mechanism 120, an operating mechanism 140 structured to cause the primary contacts 100 to open to interrupt current flowing to the load upon detecting a high current event, the inventive slot motor 2000 and secondary contacts 200,220. The circuit breaker 20 also includes a solenoid 300, an actuator 400, a first spring 500, and a second spring 600. The circuit breaker 20 may be remotely-operable by an end-user or the utilities via wireless (e.g., WiFi, Bluetooth®, LTE, etc.) or wired connections. The secondary contacts (a movable contact 200 attached to a moving arm 210 and a stationary contact 220 attached to a stationary arm 230) act as a remote switch for the circuit breaker 20 by the end-user. The slot motor 2000 includes a top slot motor component 2010 and a bottom slot motor component 2020, and is structured to prevent chattering and excess heat generation in the secondary contacts 200,220 in the circuit breaker 20. The top slot motor component 2010 is structured to be attached (e.g., via riveting, gluing, welding, etc.) to the moving arm 210. The bottom slot motor component 2020 has a U-shape with a base and a pair of legs. The U-shaped bottom slot motor component 2020 is structured to remain stationary. It is held in place to the plastic housings of the circuit breaker 20 with the slots 2026 on the external side surfaces of the pair of legs. It may include holes in the sides (the pair of legs) with corresponding pegs in the enclosure body. The top and bottom slot motor components 2010,2020 are separated from each other by a vertical gap between the bottom surface of the top slot motor component 2010 and the top portions of the pair of legs of the bottom slot motor component 2020. When current passes through the moving arm 210, the top and bottom slot motor components 2010,2020 generate a magnetic field, which creates a closing force to maintain the secondary contacts 200,220 closed. The second spring 600 is structured to push on a pin within the solenoid 300, thereby pushing the actuator 400 down. The actuator 400, in turn, pushes on the moving arm 210. The additional torsion spring 600 provides additional closing force for the secondary contacts 200,220. The slot motor 2000 is discussed further in detail with reference to FIGS. 7A-E. FIG. 6B shows the current path 250 in the circuit breaker 20 when the secondary contacts 200,220 are closed. It starts from a utility power source (not shown) via a source terminal and ends at a load (not shown).

Figure 7A:
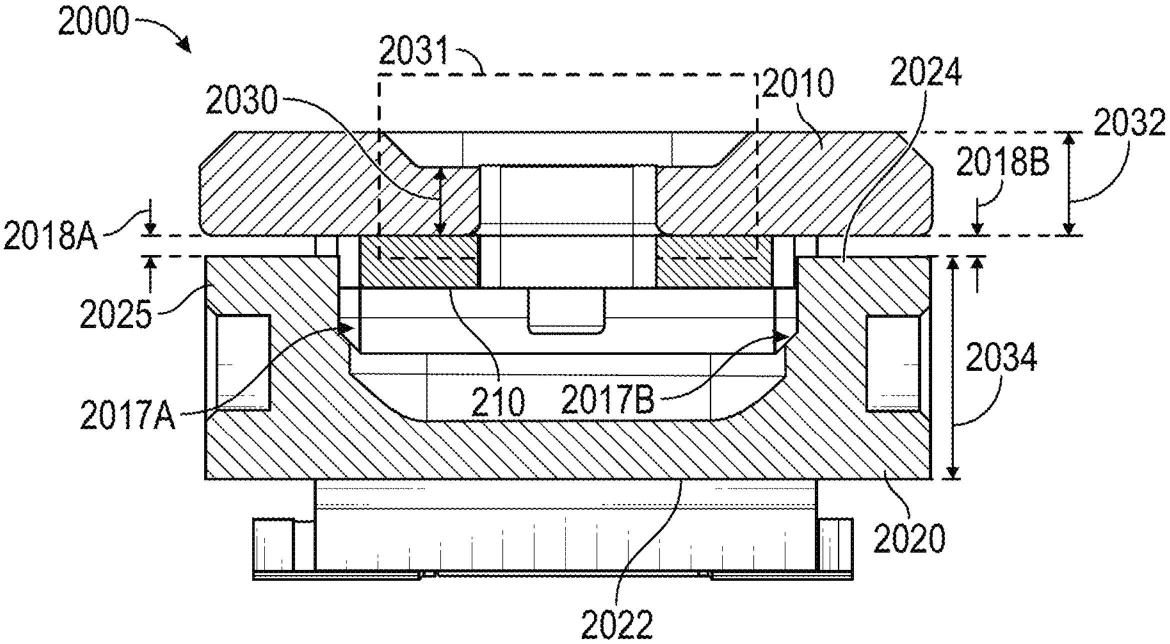
FIGS. 7A-E illustrate a slot motor in accordance with an example embodiment of the disclosed concept.

FIGS. 7A-E illustrate a slot motor 2000 according to an example embodiment of the disclosed concept. FIG. 7A illustrates a cross-sectional view of the slot motor 2000 including a top slot motor component 2010 attached (e.g., riveted, welding, gluing, etc.) to the moving arm 210 and a bottom slot motor component 2020. Slot motor 2000 is different from the conventional slot motor 1000 in several ways. First, the top slot motor component 2010 is no longer U-shaped as in the conventional slot motor 1000, and the bottom slot motor component 2020 now has the U-shape, including a base 2022 and a pair of legs 2024,2025 extending upwards from the base 2022 toward the top slot motor component 2010. This configuration places the vertical gaps 2018A,2018B much closer to the moving arm 210 as compared to those in the conventional slot motor 1000, thereby increasing the magnetic fields generated by the slot motor in the event of an inrush current.

Figure 7B:
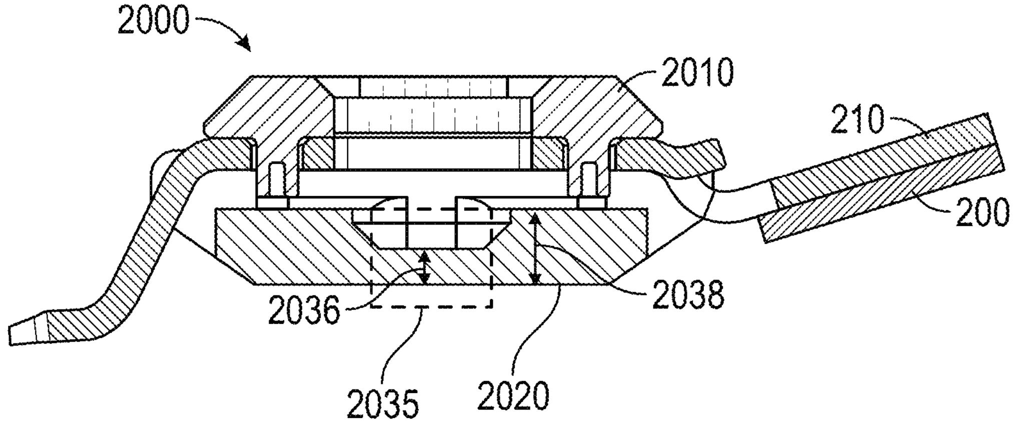

Further, this configuration allows the thickness of the bottom slot motor component 2020 to be increased at the base 2022 and the pair of legs 2024,2025. This is important in that the magnetic field is proportional to the current. However, as the current and magnetic field increase, the blow-off force $F_{blow\ off}$ also increases. Therefore, in order to increase forces generated by the slot motor 2000 without increasing $F_{blow\ off}$ increasing the thickness of the top and bottom slot motor components is critical. Given the limited space within the circuit breaker, inverting the slot motor (upside down) achieves the increase in thickness of the slot motor 2000 as desired. As shown in FIG. 7A, the top slot motor component 2010 has, e.g., without limitation 0.062 inch in nominal thickness 2030 for the area 2031 in which the actuator 400 is placed and 0.093 inches in nominal thickness 2032 for portions surrounding the area 2031 in which the actuator 400 is placed. This is a significant increase in thickness of the top slot motor component 2010 as compared to the 0.062 inch nominal thickness all around for the bottom slot motor component 1020 of the conventional slot motor 1000 as discussed with reference to FIG. 3A. Likewise, for the bottom slot motor component 2020 the height 2034 of the pair of legs 2024,2025 is, e.g., without limitation, 0.203 inch and the base 2022 has varying thicknesses (e.g., without limitation, 0.055 inches in nominal thickness 2036 for the area 2035, 0.115 inches in nominal thickness 2038 around the area 2035, etc.) as shown in FIG. 7B. This is also a significant increase in thickness over the top slot motor component 1010 having the nominal thickness of 0.062 inches for the base 1012 and the pair of legs 1014,1015 of the conventional slot motor 1000. In some examples, as a result of the increased thickness of the slot motor 2000, chamfers and rounds to both the top and bottom slot motor components 2010,2020 are added in order to make the slot motor 2000 fit in the circuit breaker as shown in FIGS. 8A-B.

Figure 7C:
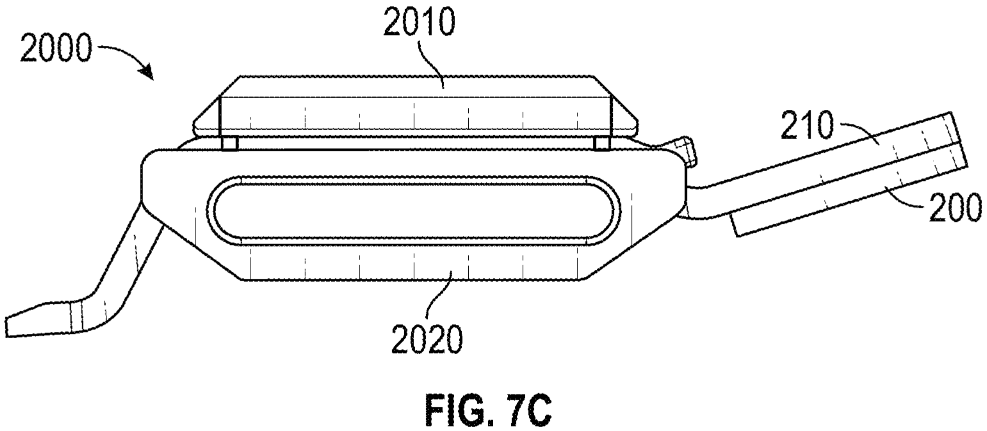
Figure 7D:
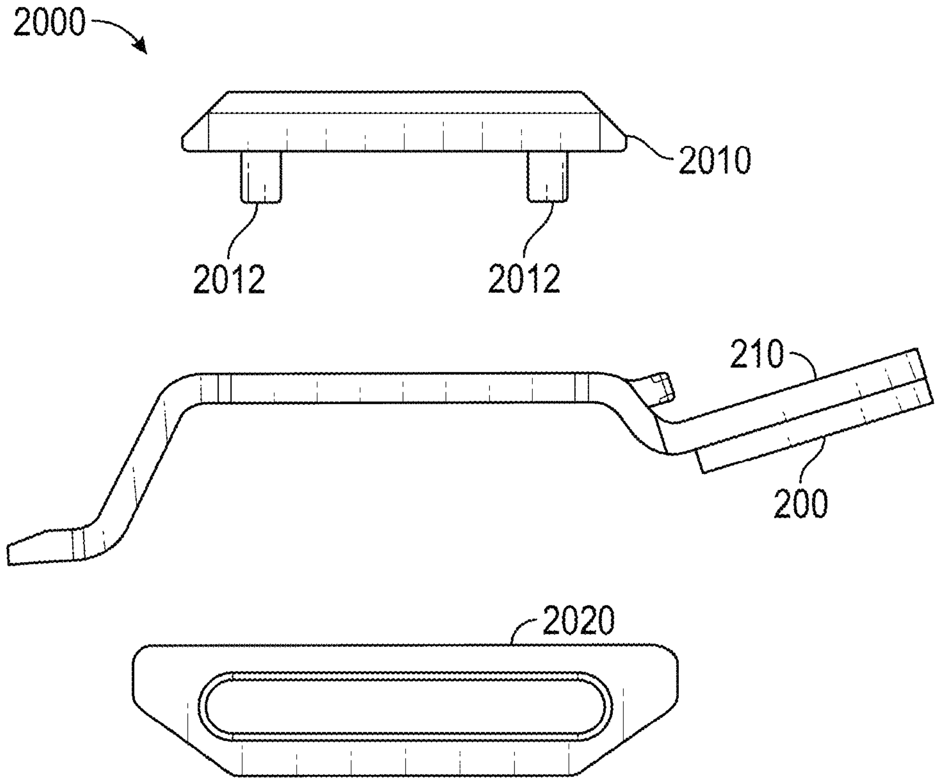
Figure 7E:
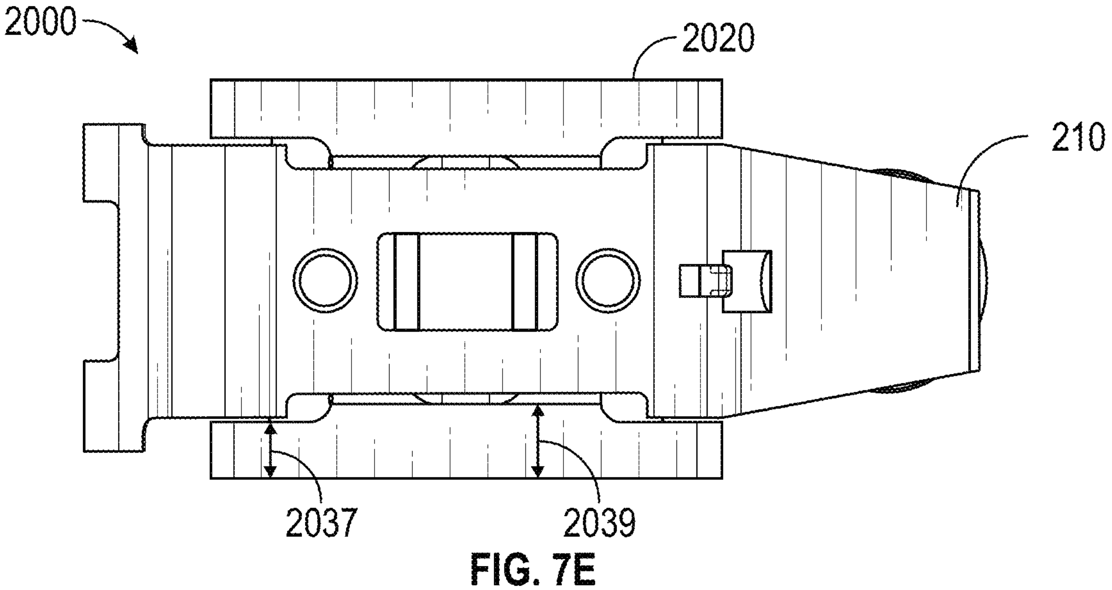

Second, the vertical gaps 2018A,B are made as small as possible and placed in the same plane as the moving arm 210 is placed in order to also increase the magnetic field, and thus, increase the closing force generated by the slot motor 2000. The slot motor 2000 is made of magnetic material, e.g., magnetic steel, with high saturation flux density and low coercivity. FIG. 7C is a side view of the slot motor 2000 with the moving arm 210 attached to the top slot motor component 2010. The top slot motor component 2010 is structured to be attached to the moving arm (e.g., a remote contact moving arm for a smart circuit breaker) 210. The bottom slot motor component 2020 is stationary. FIG. 7D is an exploded view of the slot motor 2000. The top slot motor component 2010 includes connecting elements 2012 (e.g., screw holes) structured to connect the top slot motor component 2010 with the moving arm 210. FIG. 7E illustrates a moving arm 210 fit to the bottom slot motor component 2020 and the bottom slot motor component 2020 having varying widths 2037 (e.g., without limitation, 0.094 nominal inches) and 2039 (e.g., without limitation, 0.123 nominal inches).

Figure 8A:
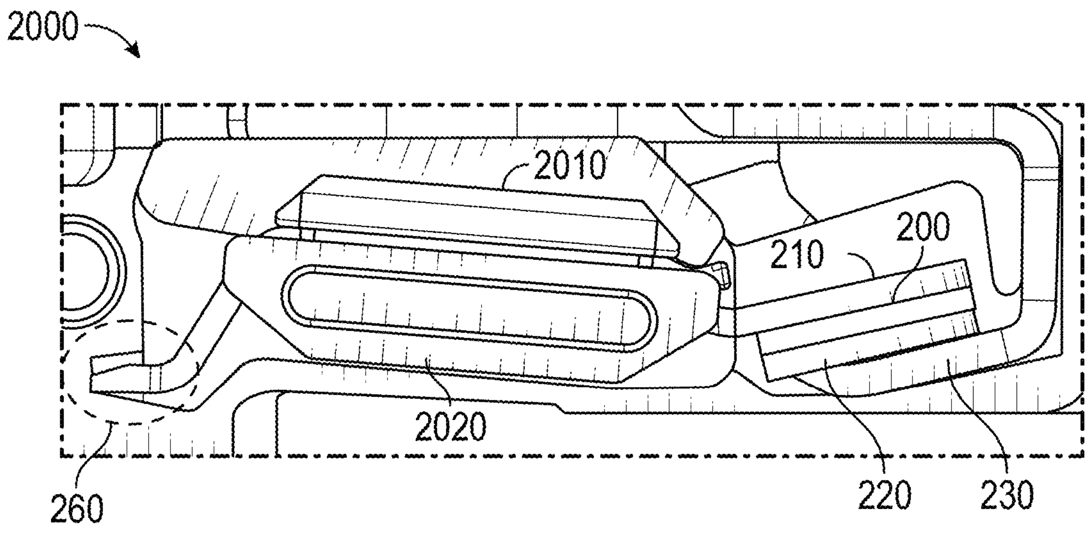
FIGS. 8A-B illustrate a slot motor according to an example embodiment of the disclosed concept.
Figure 8B:
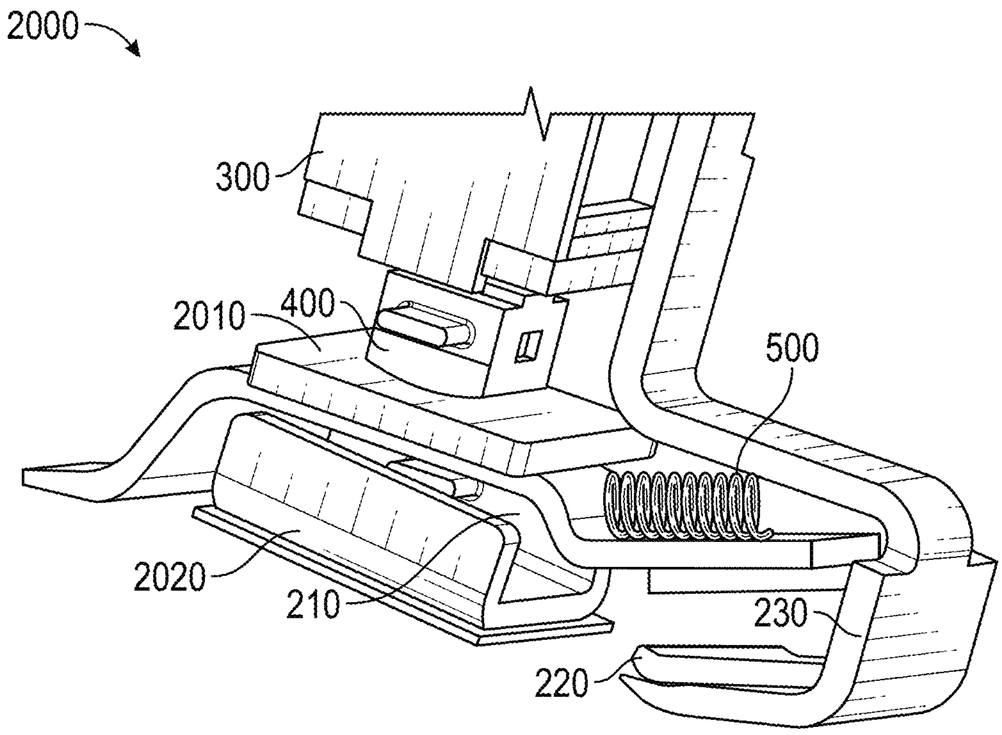

FIGS. 8A-B illustrate secondary contacts in different positions according to an example embodiment of the disclosed concept. FIG. 8A is a side view of the slot motor 2000 with the secondary contacts 200,220 in a closed position. The moving arm 210 pivots at location 260 in the plastic housing of the circuit breaker 20. FIG. 8B is a perspective view of the slot motor 2000 with the secondary contacts 200,220 in an open position.

Figure 9A:
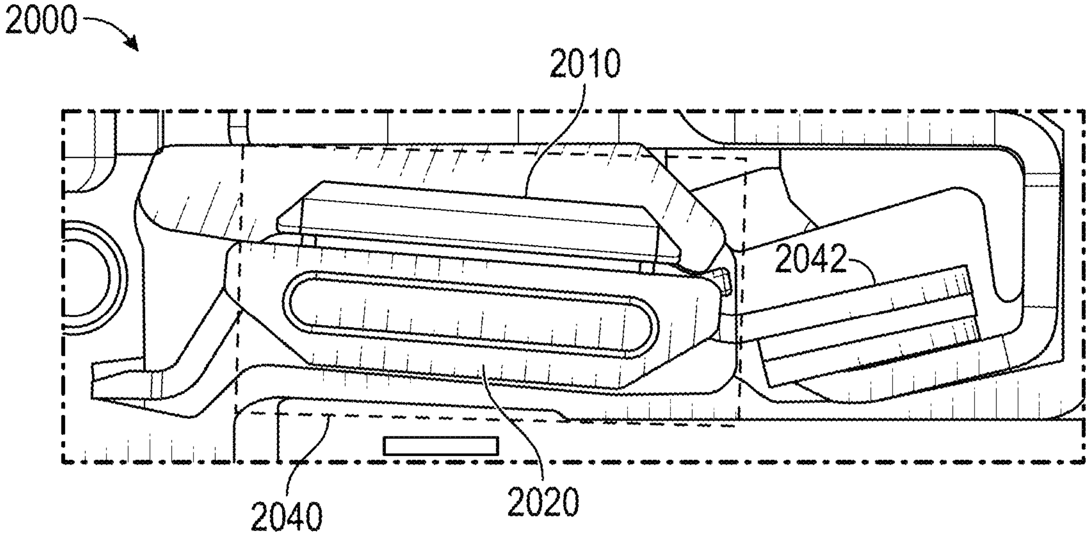
FIGS. 9A-D illustrate magnetic fields and contact force generated by a slot motor according to an example embodiment of the disclosed concept.
Figure 9B:
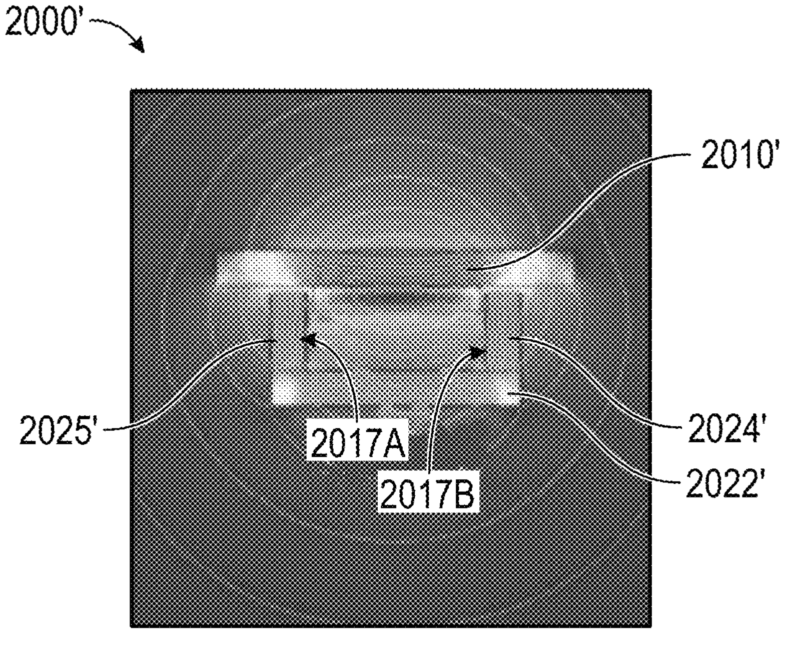
Figure 9C:
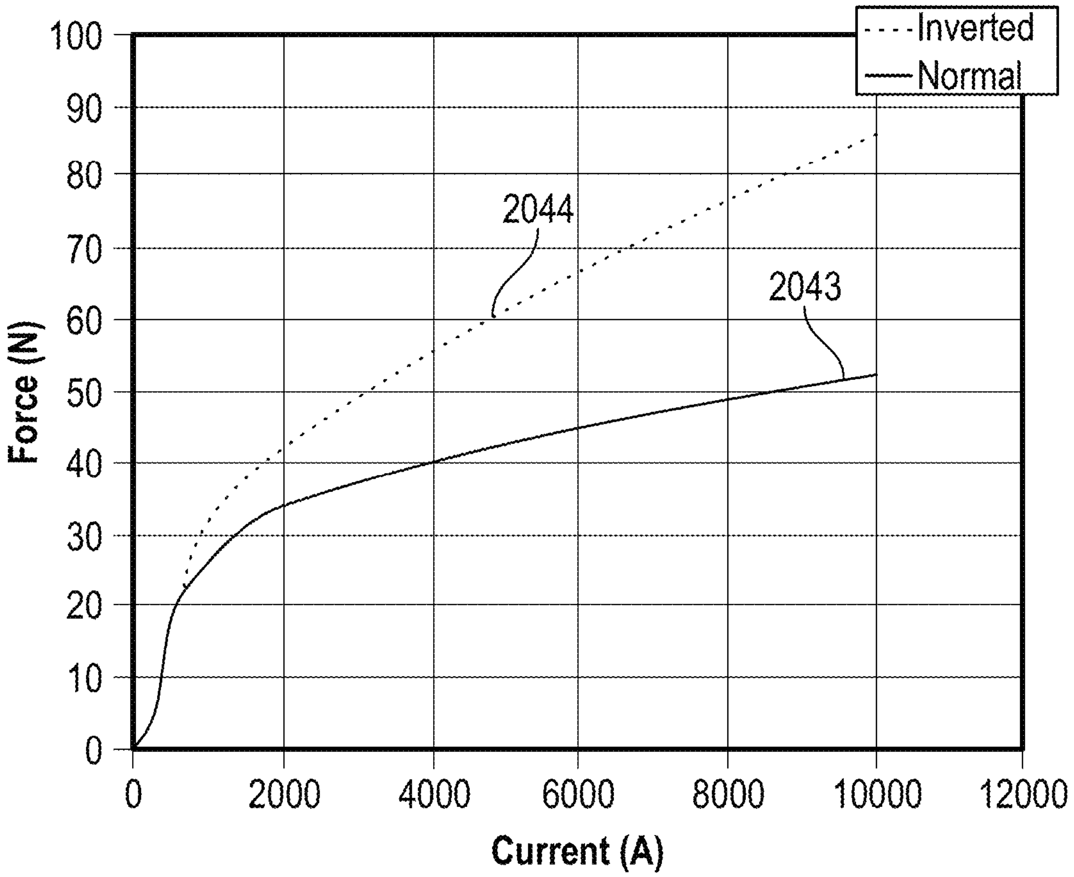
Figure 9D:
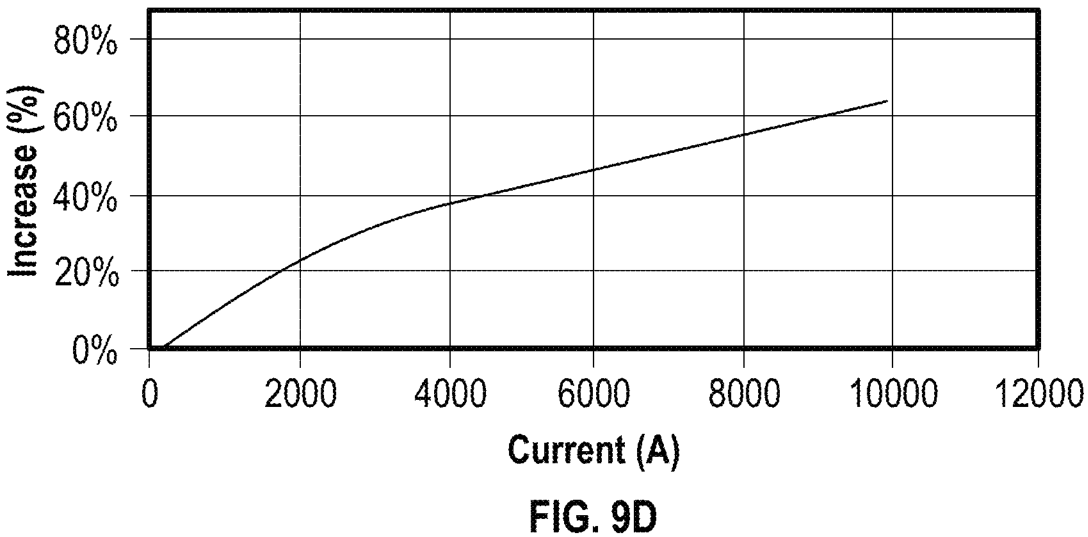

FIGS. 9A-D illustrate the magnetic fields 2040 and closing force (slot motor force) 2042 generated by the slot motor 2000,2000' according to an example embodiment of the disclosed concept. When current passes the moving arm 210, the top and bottom slot motor components 2010,2020 generate magnetic fields. These magnetic fields create a force 2042 to keep the contacts 200,220 closed (in contact) as shown in FIG. 9A. FIG. 9B shows magnetic fields generated by the slot motor 2000' having 0.2 mm horizontal gaps 2017A,B between the pair of legs 2024',2025' of the bottom slot motor component 2020' and the top slot motor component 2010'. The slot motor 2000' is different from the slot motor 2000 in that it has the same thickness for both the top and bottom slot motor components 2010' and 2020' all around. In FIG. 9C, the slot motor 2000' generates more $F_{slot\ motor}$ 2044 than the $F_{slot\ motor}$ 2043 generated by the conventional slot motor 1000. FIG. 9D shows that there is more than 60% increase in the $F_{slot\ motor}$ at the maximum current. It has been shown that the slot motor force $F_{slot\ motor}$ depends rather weakly on the gaps between the top and bottom slot motor components 2010,2020.

Figure 10A:
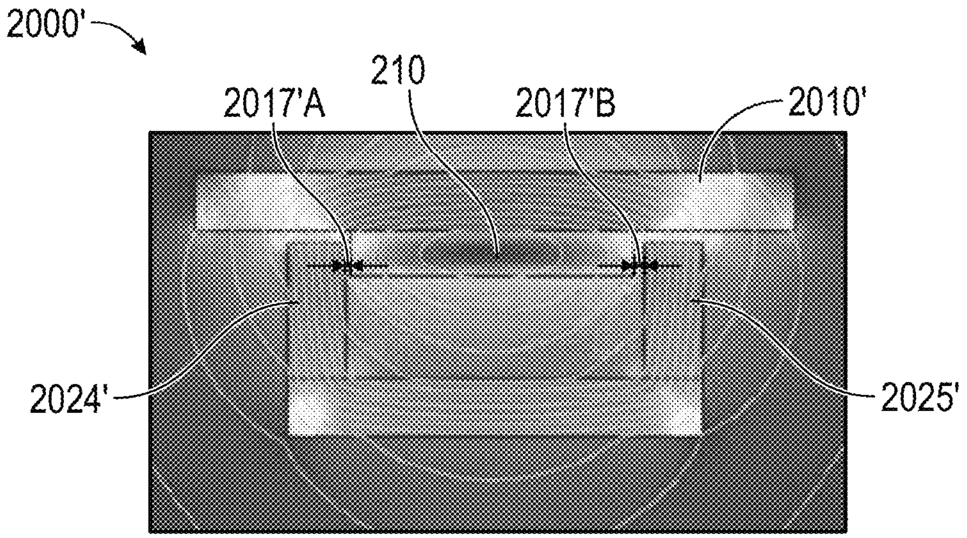
FIGS. 10A-B illustrate contact force generated based on horizontal misalignment of the moving arm according to an example embodiment of the disclosed concept.
Figure 10B:
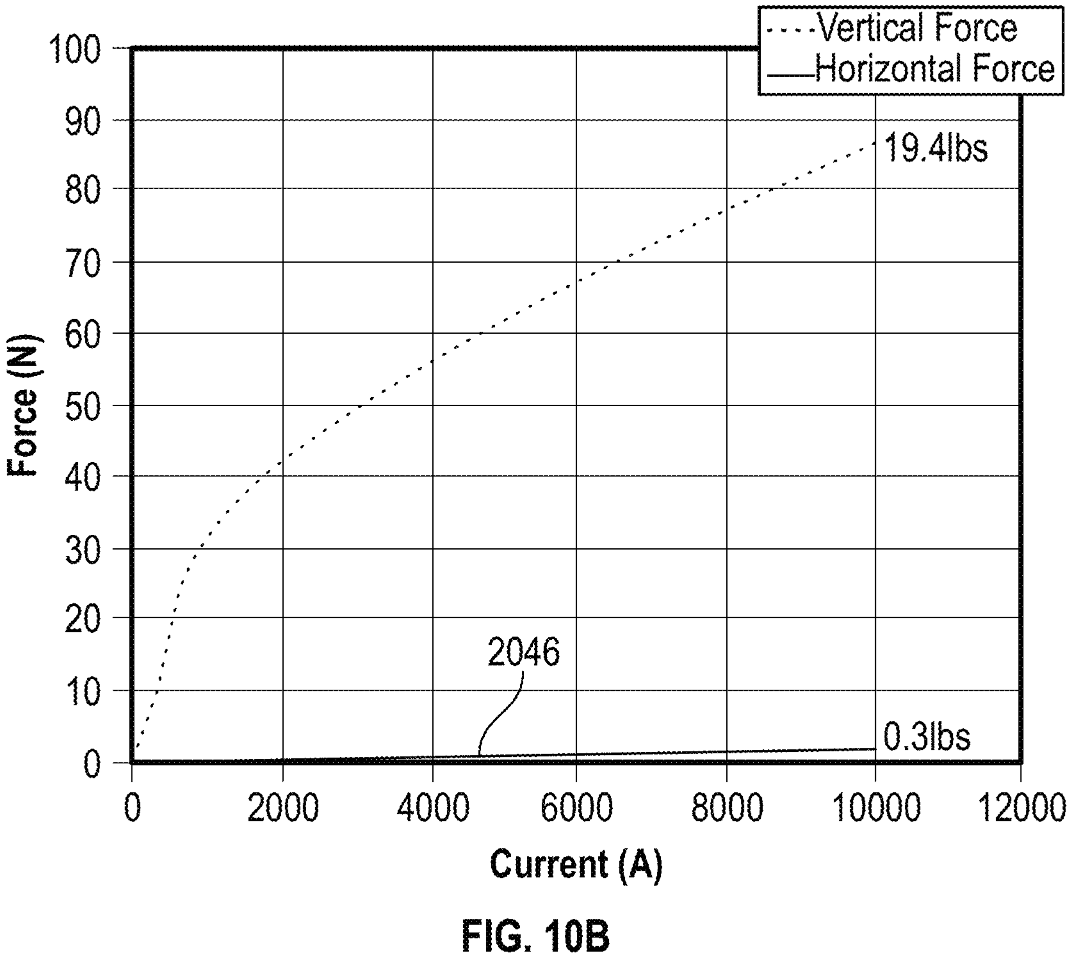
Figure 11A:
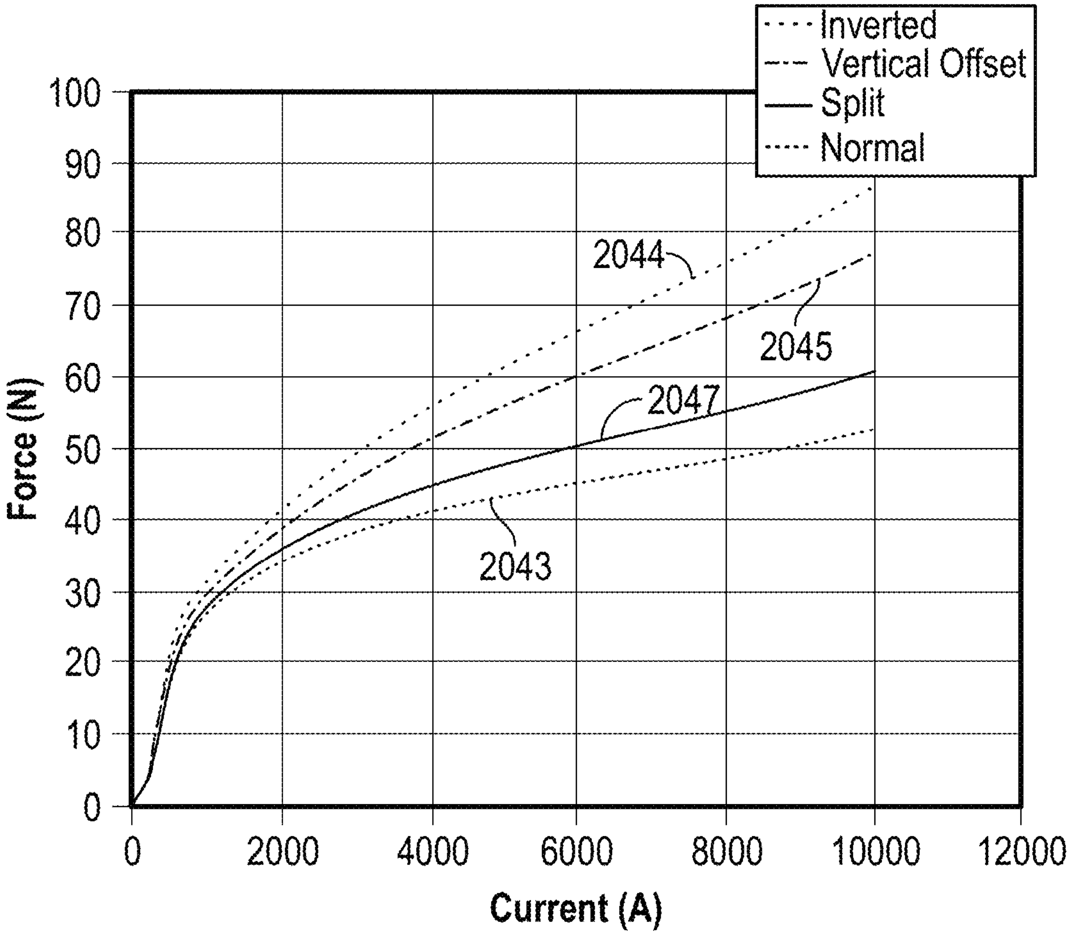
FIGS. 11A-D illustrate magnetic fields and contact force generated by a plurality of conventional slot motors and an inventive slot motor according to an example embodiment of the disclosed concept.
Figure 11B:
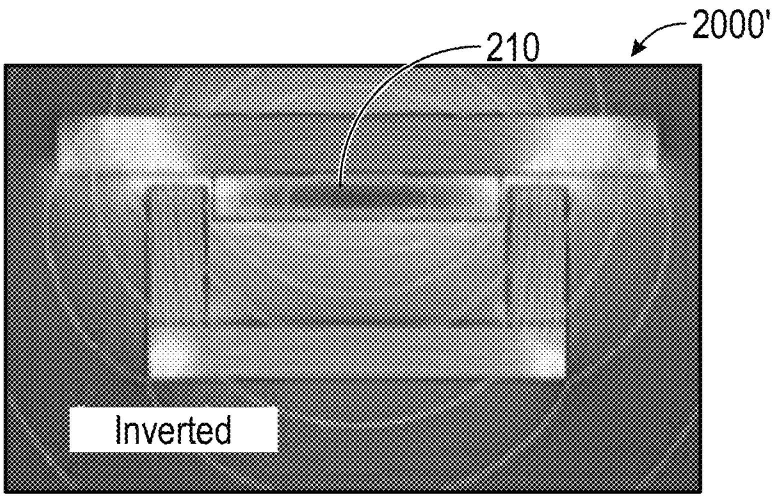
Figure 11C:
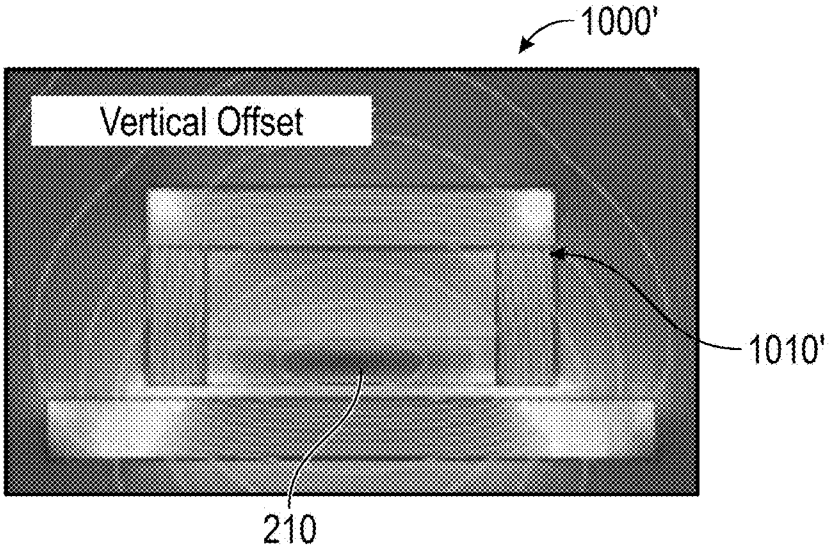
Figure 11D:
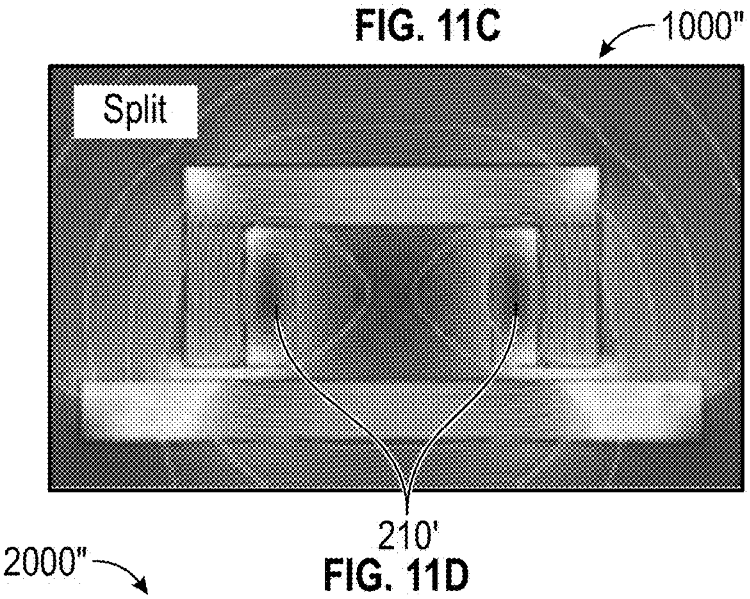

FIGS. 10A-B illustrate reduced slot motor force due to horizontal misalignment in a slot motor 2000' according to an example embodiment of the disclosed concept. When the horizontal gaps 2017'A (0.1 mm) and 2017'B (0.3 mm) between the moving arm 210 and the pair of legs 2024',2025' of the bottom slot motor component 2020' is misaligned as shown in FIG. 10A, the horizontal force 2046 is reduced to 1.3 N (0.31 bf) as shown in FIG. 10B from, e.g., the horizontal force of the slot motor 2000' with the aligned horizontal gaps 2017A,2017B (i.e., both being 0.2 mm).

FIGS. 11A-D illustrate changes in slot motor force according to an example embodiment of the disclosed concept. FIG. 11A-D show that the inventive slot motor 2000', which is inverted in shape as compared to the conventional slot motor 1000, has the highest slot motor force 2044, the conventional slot motor 1000' with a vertical offset for the moving contact 210 has the second highest slot motor force 2045, the conventional slot motor 1000" with split moving arms (two moving arms) 210' has the third highest slot motor force 2047, and the conventional slot motor 1000 has the lowest slot motor force 2043. The vertical offset means that the moving arm 210 is vertically moved down towards the bottom of the top U-shaped slot motor component 1010' of the conventional slot motor 1000'.

Figure 12A:
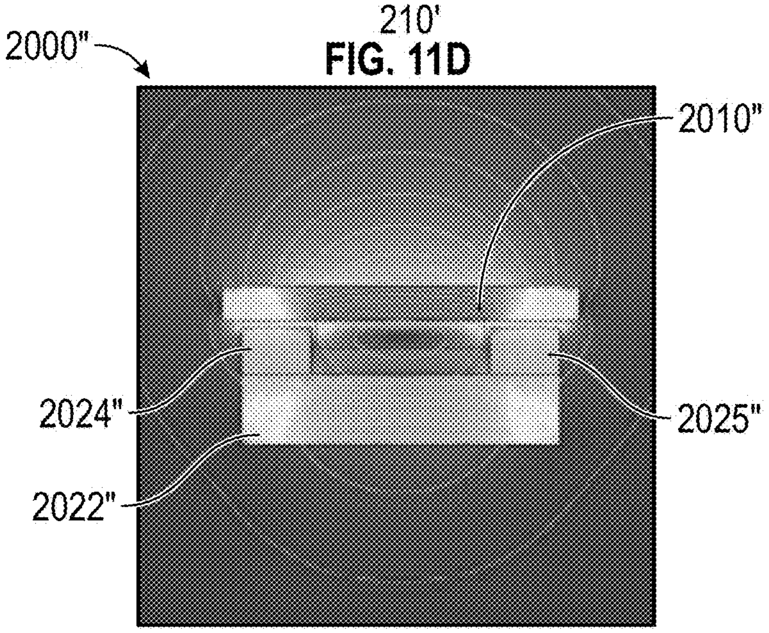
FIGS. 12A-B illustrate magnetic fields and contact force generated by a slot motor according to an example embodiment of the disclosed concept.
Figure 12B:
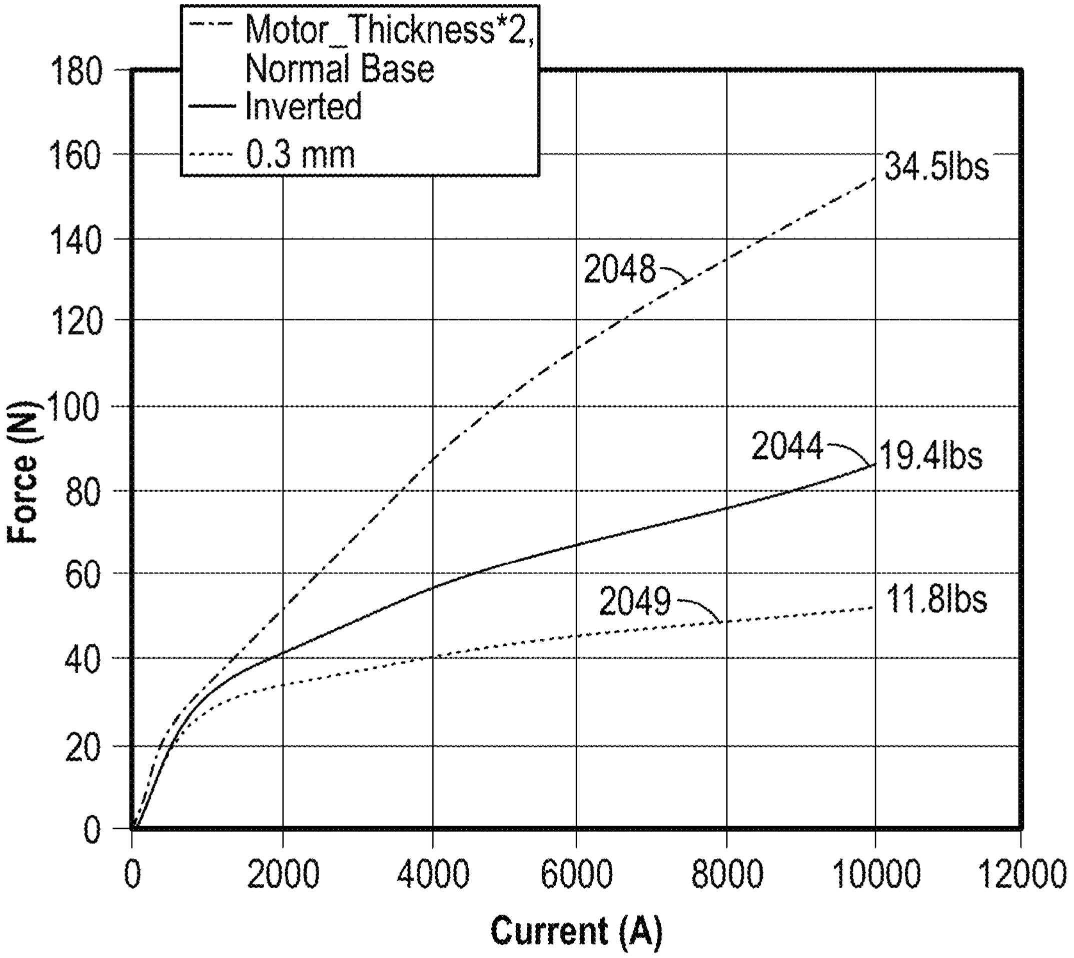

FIGS. 12A-B illustrate magnetic field and force generated by a slot motor 2000" according to an example embodiment of the disclosed concept. As shown in FIG. 12A, the base 2022" and a pair of legs 2024",2025" have increased thicknesses than those of the slot motor 2000,2000'. FIG. 12B shows that the force 2048 generated by the slot motor 2000" is double the amount of force 2044 generated by an example inverted slot motor 2000' having the same thickness (e.g., 0.062 inches) as the conventional slot motor 1000, and almost three times more than the amount of force 2049 generated by a conventional slot motor having 0.3 mm thickness.

Figure 13A:
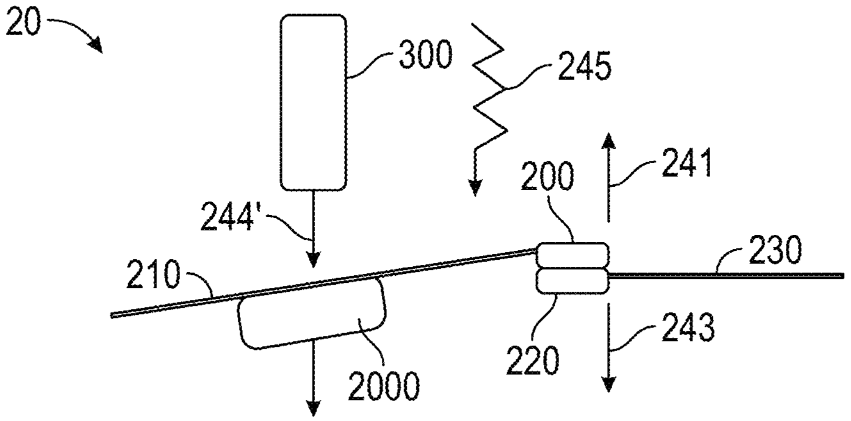
FIGS. 13A-C illustrate balance of forces at the secondary contacts in a circuit breaker according to an example embodiment of the disclosed concept.
Figure 13B:
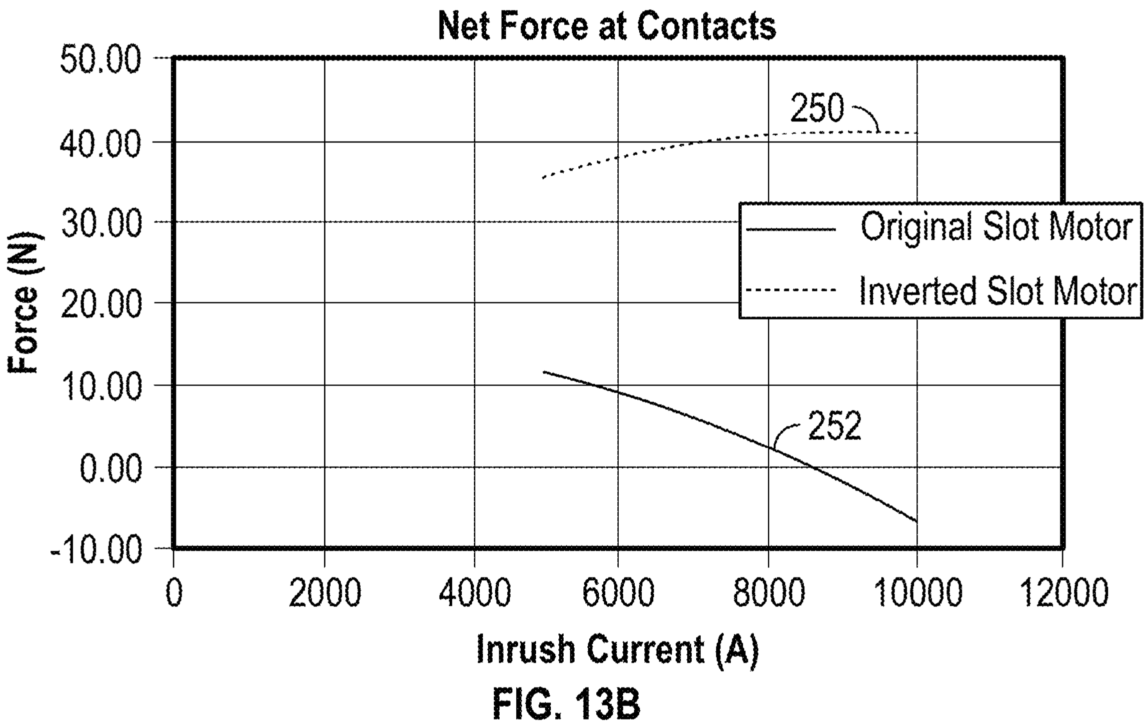
Figure 13C:
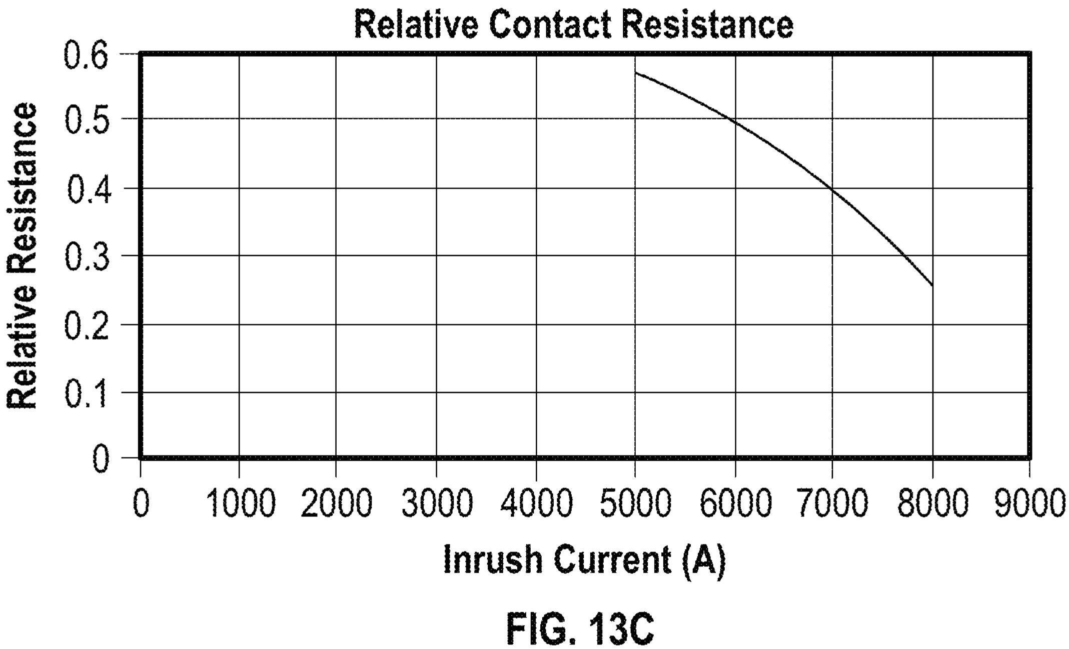

FIGS. 13A-C shows balance of forces associated with the secondary contacts 200,220 in a circuit breaker 20 using a slot motor (inverted slot motor) 2000 according to an example embodiment of the disclosed concept. The circuit breaker 20 includes a slot motor 2000 attached to the moving arm 210, a solenoid 300, and a spring. With the secondary contacts 200, 220 in contact, FIG. 13A shows a balance of forces based on the solenoid force $F_{solenoid}$ 244' being applied to an actuator for the moving arm 210, blow off force $F_{blow\ off}$ 241 and blow on force F blow on 243 at the contacts 200,220, and spring force $F_{spring}$ 245 pressing down on the movable contact 210. The blow off force $F_{blow\ off}$ 241 attempts to separate two contacts 200,220 when the current is flowing between them when they are in contact. The blow on force $F_{blow\ on}$ 243 attempts to keep the two contacts 200,220 remain in contact. FIG. 13B shows the net forces 250 at the contacts 200,220 using the inverted slot motor 2000 is significantly higher than the net forces 252 at the contacts using the conventional slot motor 1000. The higher net forces at the contacts 200,220 with the inverted slot motor 2000 result in less contact resistance and less energy $E_{melt}$ to melt the contact material than those when using the conventional slot motor 1000. FIG. 13C shows that relative contact resistance decreases as the inrush current increases with the use of the inverted slot motor 2000.

Figure 14:
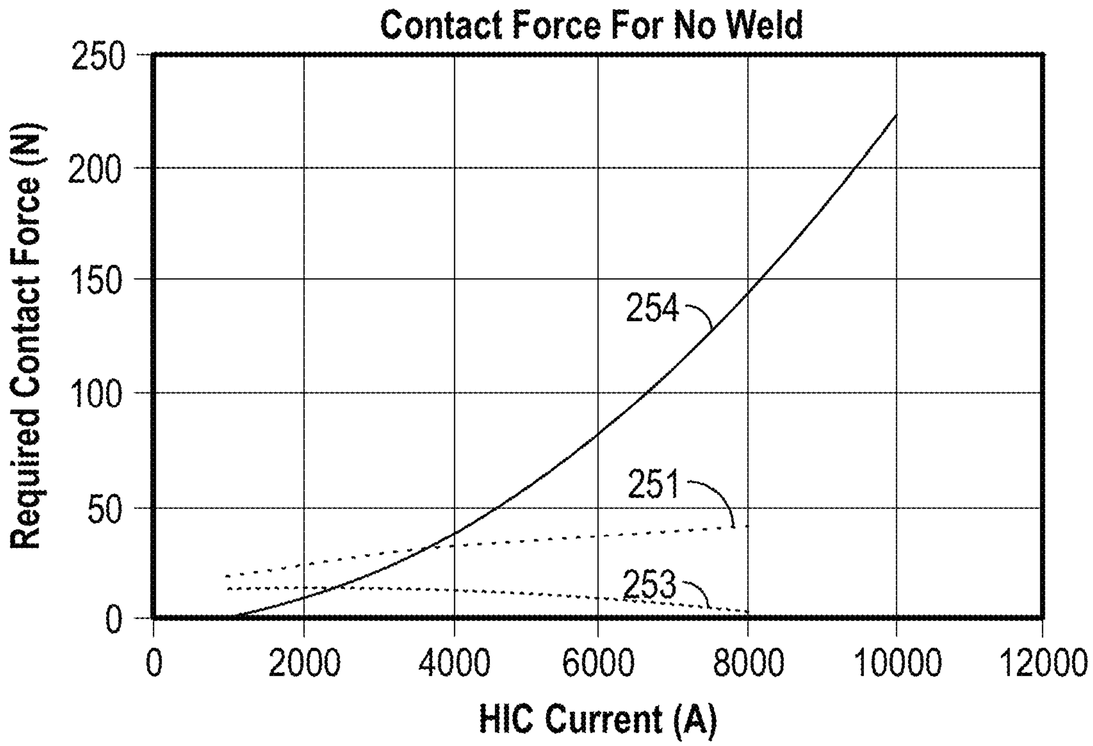
FIG. 14 illustrates contact forces for no weld according to example embodiments of the disclosed concept.

FIG. 14 shows contact forces for no tack weld according to an example embodiment of the disclosed concept. FIG. 14 illustrates minimum contact force 254 for no weld, contact force 251 for a circuit breaker using the inverted slot motor 2000, and contact force 253 for a circuit breaker using the conventional slot motor 1000. As shown in FIG. 14, the contact force 251 is greater than the minimum for inrush currents less than 4000 A and the contact force 253 is greater than the minimum for inrush currents less than 2500 A. Thus, for a circuit breaker using the inverted slot motor 2000, there may be no welds for currents less than 4000 A. For a circuit breaker using the conventional slot motor 1000, the contact force 253 is greater than the minimum for inrush currents less than 2500 A. It has been observed that for a circuit breaker using the slot motor 2000 and an arc bypass of 3500 A, there may be no welds for currents less than 7500 A. In order to avoid welding in an arc bypass, the current flowing in the contacts $I_{contacts}$ needs to be less than the minimum welding current as shown below:

$$I_{contacts}=I-I_{bypass}<I_{min\ weld} \qquad \text{EQ. 14}$$

where $I_{bypass}$ is the arc bypass current. As such, if there is an arc bypass when using the inverted slot motor 2000, then to achieve no weld it needs to siphon off about 3500 A for the maximum inrush current of 7500 A.

Figure 15:
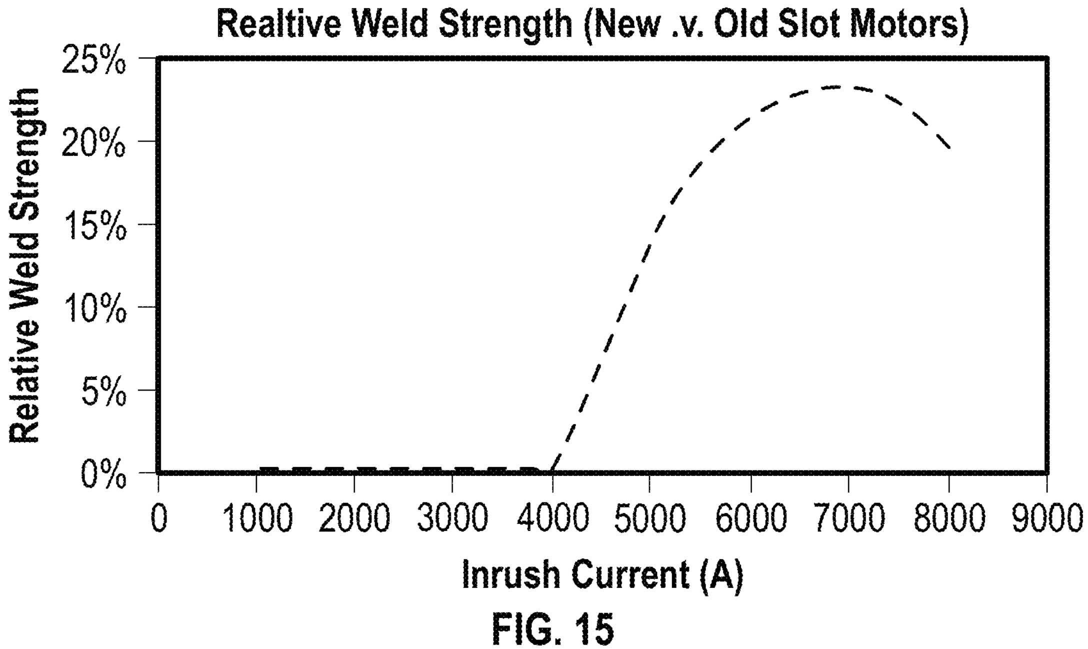
FIG. 15 illustrates relative weld strength of a slot motor according to an example embodiment of the disclosed concept.

FIG. 15 illustrates relative weld strength of the slot motor 2000 as opposed to the conventional slot motor 1000 according to an example embodiment of the disclosed concept. The maximum weld strengths with the inventive slot motor 2000 and the conventional slot motor 1000 are estimated. With the use of the inventive slot motor 2000, the maximum weld strength may be reduced to 25%-50% of the conventional slot motor 1000.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof

What is claimed is:

1. A slot motor for use with secondary contacts in a circuit breaker, comprising:

a movable top slot motor component structured to be directly attached to a moving arm of the secondary contacts; and a stationary U-shaped bottom slot motor component including a base and a pair of legs extending upward from the base, the U-shaped bottom slot motor component structured to be separated from the top slot motor component by vertical gaps between the top slot motor component and ends of the pair of legs, wherein the slot motor is structured to generate a magnetic field producing a force to maintain the secondary contacts in a closed position during a high current event.

2. The slot motor of claim 1, wherein the moving arm is disposed within the U-shaped bottom slot motor component.

3. The slot motor claim 1, wherein the vertical gaps are in the same plane as a plane in which the moving arm is arranged.

4. The slot motor of claim 1, wherein the vertical gaps are minimized to increase the magnetic field and the force.

5. The slot motor of claim 1, wherein the ends of the pair of legs of the U-shaped bottom slot motor component are separated from the moving arm by horizontal gaps.

6. The slot motor of claim 5, wherein the horizontal gaps have a same size.

7. The slot motor of claim 1, wherein thicknesses of the top slot motor component and the U-shaped bottom slot motor component are maximized to increase the magnetic field and the force.

8. The slot motor of claim 7, wherein the top slot motor component includes a center portion in which an actuator for the moving arm is arranged and a remaining portion around the center portion, and the center portion of the top slot motor component has a first thickness and the remaining portion has a second thickness larger than the first thickness.

9. The slot motor of claim 7, wherein the base of the U-shaped bottom slot motor component comprises a first thickness at a center portion surrounding an end of the actuator and a remaining portion around the center portion, and the center portion has a first thickness and the remaining portion has a second thickness larger than the first thickness.

10. The slot motor of claim of 1, wherein the bottom slot motor component is held in place to a housing of the circuit breaker via slots on external side surfaces of the pair of the legs.

11. The slot motor of claim 1, further comprising one or more chamfers to at least one of the top slot motor component or the U-shaped bottom slot motor component, the one or more chamfers structured to make the slot motor to fit within the circuit breaker.

12. The slot motor of claim 1, wherein the top slot motor component and the U-shaped bottom slot motor component are made of soft magnetic materials.

13. The slot motor of claim 1, wherein the secondary contacts act as a remote switch for the circuit breaker.

* * * * *